US011546182B2

(12) United States Patent
Krikunov et al.

(10) Patent No.: US 11,546,182 B2
(45) Date of Patent: Jan. 3, 2023

(54) METHODS AND SYSTEMS FOR MANAGING MEETING NOTES

(71) Applicant: RingCentral, Inc., Belmont, CA (US)

(72) Inventors: Alexey Krikunov, Saint-Petersburg (RU); Ivan Chirva, Saint-Petersburg (RU); Danil Bliznyuk, Saint-Petersburg (RU); Alexander Bogatko, Saint-Petersburg (RU); Vlad Vendrow, Reno, NV (US); Christopher Van Rensburg, Portland, OR (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 16/934,776

(22) Filed: Jul. 21, 2020

(65) Prior Publication Data
US 2021/0306173 A1   Sep. 30, 2021

Related U.S. Application Data

(63) Continuation of application No. PCT/RU2020/000189, filed on Mar. 26, 2020.

(51) Int. Cl.
*H04L 12/18* (2006.01)
*G06V 40/20* (2022.01)
*G06V 40/16* (2022.01)

(52) U.S. Cl.
CPC ........ *H04L 12/1831* (2013.01); *G06V 40/176* (2022.01); *G06V 40/20* (2022.01); *H04L 12/1818* (2013.01); *H04L 12/1822* (2013.01)

(58) Field of Classification Search
None
See application file for complete search history.

(56) References Cited

U.S. PATENT DOCUMENTS 8,600,100 B2 * 12/2013 Hill ................. A61B 5/164
                                                          382/118
8,775,948 B2 *  7/2014 Ark .................. G06F 11/3006
                                                          715/753

(Continued)

FOREIGN PATENT DOCUMENTS

CN         104603807 A  *  5/2015  ............ H04N 7/15

OTHER PUBLICATIONS

O. Garcia, J. Favela and R. Machorro, "Emotional awareness in collaborative systems," 6th International Symposium on String Processing and Information Retrieval. 5th International Workshop on Groupware (Cat. No. PR00268), Cancun, Mexico, 1999, pp. 296-303, doi: 10.1109/SPIRE.1999.796607. (Year: 1999).*

(Continued)

*Primary Examiner* — Uzma Alam
(74) *Attorney, Agent, or Firm* — Finnegan, Henderson, Farabow, Garrett & Dunner, LLP

(57) ABSTRACT

The present disclosure provides systems and methods for managing meeting notes. In accordance with some embodiments, a method is provided that includes receiving nonverbal cue information associated with one or more meeting participants, determining an engagement level for each of the one or more meeting participants based on emotional information associated with the nonverbal cue information, composing meeting notes based on the determined engagement level for each of the one or more meeting participants, and storing the meeting notes.

19 Claims, 18 Drawing Sheets

(56) References Cited

U.S. PATENT DOCUMENTS

| | | | | |
|---|---|---|---|---|
| 9,075,507 | B2* | 7/2015 | Dempski | G06F 3/0482 |
| 9,141,604 | B2* | 9/2015 | Thirumalainambi | G06F 40/242 |
| 9,183,534 | B2* | 11/2015 | Gharabally | G06Q 10/10 |
| 9,350,851 | B1* | 5/2016 | Halls | H04W 4/029 |
| 9,734,208 | B1* | 8/2017 | Goldstein | G06Q 10/10 |
| 10,043,063 | B1* | 8/2018 | Perfido | G06V 40/176 |
| 10,176,365 | B1* | 1/2019 | Ramanarayanan | G06V 40/20 |
| 10,789,576 | B2* | 9/2020 | Bellamy | G06Q 10/1095 |
| 10,881,964 | B1* | 1/2021 | Dills | G06N 3/0454 |
| 11,228,625 | B1* | 1/2022 | Libin | G06V 40/176 |
| 2009/0181646 | A1* | 7/2009 | Bouazizi | H04N 21/4882 455/412.2 |
| 2009/0234718 | A1* | 9/2009 | Green | G06Q 30/0203 705/7.32 |
| 2011/0295392 | A1* | 12/2011 | Cunnington | G06Q 10/10 702/19 |
| 2012/0002848 | A1* | 1/2012 | Hill | G16Z 99/00 382/118 |
| 2012/0089396 | A1* | 4/2012 | Patel | G10L 25/00 704/E15.005 |
| 2012/0204119 | A1* | 8/2012 | Lefar | H04L 12/1827 715/756 |
| 2012/0290508 | A1* | 11/2012 | Bist | G06F 16/48 706/10 |
| 2016/0042648 | A1* | 2/2016 | Kothuri | G06K 9/6289 434/236 |
| 2018/0285997 | A1* | 10/2018 | Bostick | G06Q 50/205 |
| 2018/0300751 | A1* | 10/2018 | Hammitt | G06N 3/08 |
| 2019/0147367 | A1* | 5/2019 | Bellamy | G06N 3/006 706/12 |
| 2019/0172493 | A1* | 6/2019 | Khan | G11B 27/102 |
| 2019/0228439 | A1* | 7/2019 | Anthony | G06Q 30/0271 |
| 2019/0286890 | A1* | 9/2019 | Khanna | G06V 40/20 |
| 2019/0384380 | A1* | 12/2019 | Woo | G06K 9/6274 |
| 2020/0026729 | A1* | 1/2020 | Narasimha | G06F 16/7867 |
| 2020/0135045 | A1* | 4/2020 | Alyuz Civitci | G06Q 50/20 |
| 2020/0186375 | A1* | 6/2020 | Faulkner | H04L 63/104 |
| 2020/0228359 | A1* | 7/2020 | el Kaliouby | G06V 10/764 |
| 2020/0342895 | A1* | 10/2020 | Jung | G10L 15/26 |
| 2020/0342979 | A1* | 10/2020 | Sadowsky | A61B 5/165 |
| 2021/0076002 | A1* | 3/2021 | Peters | H04N 7/152 |
| 2022/0012500 | A1* | 1/2022 | Han | G06V 40/20 |

OTHER PUBLICATIONS

Cognitive Meeting Assistant: a method for capturing, analyzing and organizing meeting transcripts, Dec. 21, 2016, IP.com (Year: 2016).*

Jaimes, et al. Affective Meeting Video Analysis. 2005. IEEE (Year: 2005).*

Ahmed. Modelling and Analyzing Behaviors and Emotions via Complex User interactions.May 2018. arXIV. pp. 93-100 (Year: 2018).*

Dzedzickis et al. Human Emotion Recognition: review of sensors and methods, Dec. 21, 2020. MDPI (Year: 2020).*

* cited by examiner

FIG. 12
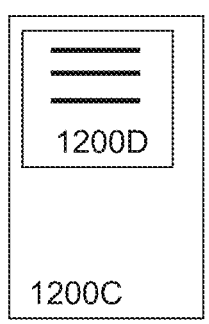
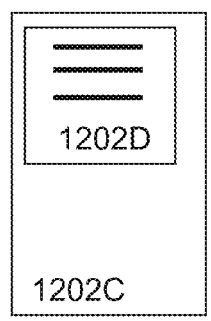
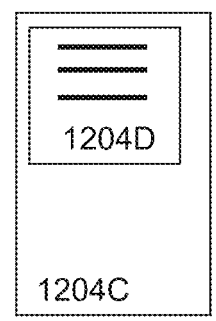
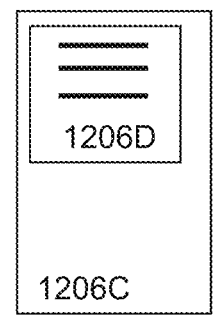
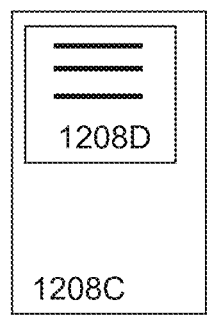
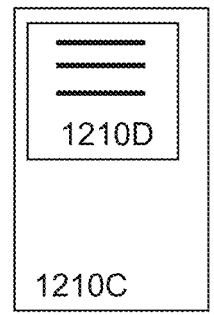
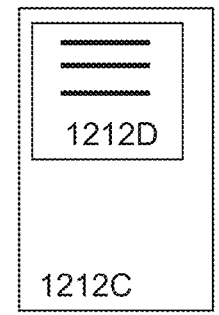
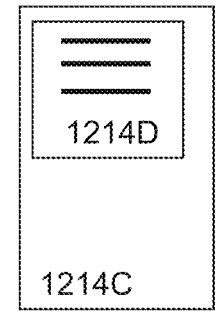

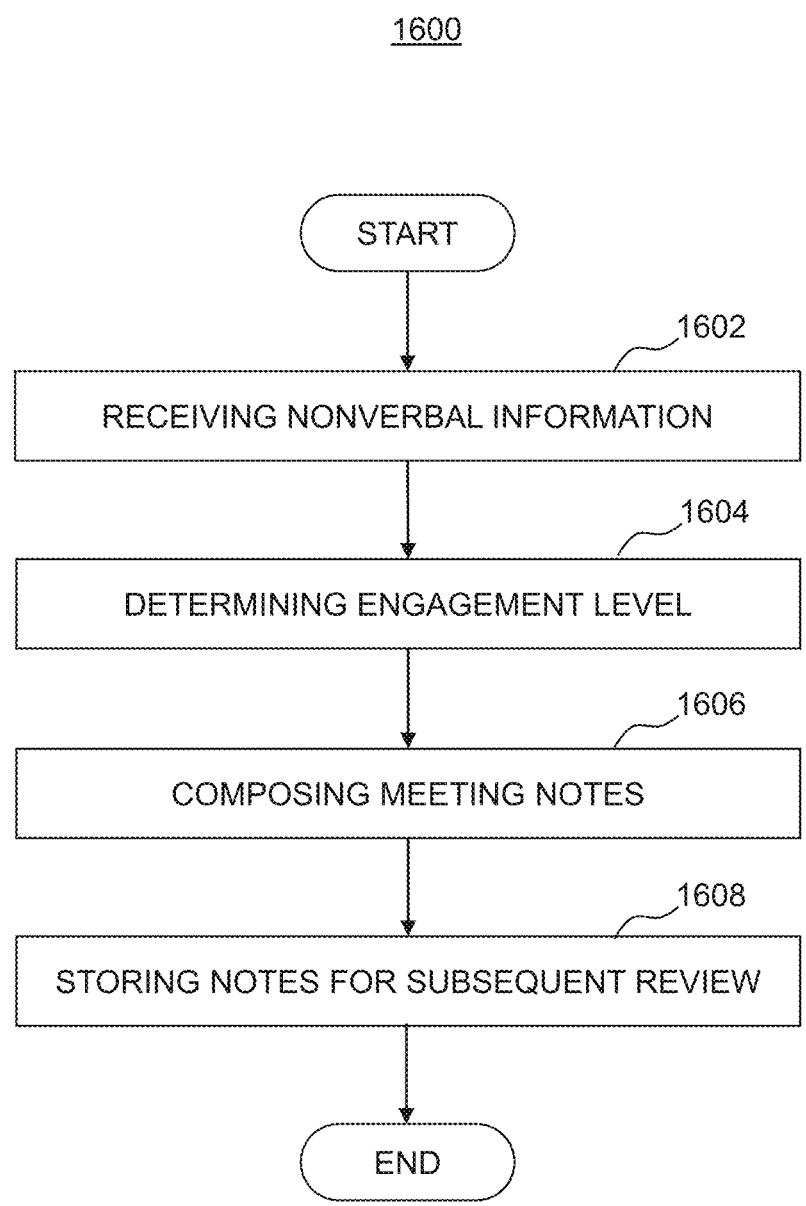

METHODS AND SYSTEMS FOR MANAGING MEETING NOTES

TECHNICAL FIELD

The present disclosure generally relates to systems and methods for managing meeting notes, including, for example, managing notes created based on nonverbal information.

BACKGROUND

Systems for managing meeting notes are known that allow meeting notes to be composed based on keywords, discussed topics, and similar information. These systems are not able to reflect all of the available information exchanged during a meeting, such as nonverbal information. This deficiency in information produces incomplete meeting notes that may not properly emphasize significant parts of the meetings. This deficiency may also produce meeting notes that do not properly interpret words said due to the inability to interpret the words in light of the nonverbal information associated with them.

SUMMARY

The embodiments of the present disclosure provide systems and methods for managing meeting notes, including notes that reflect nonverbal information exchanged during meetings. In addition, the present disclosure provides systems and methods for managing meeting notes based on emotions. Embodiments of the present disclosure provide technological improvements over existing systems and methods for managing meeting notes, as will be evident from the claims as well as the detailed description.

In some embodiments, a method for managing meeting notes based on emotions is provided that includes receiving information reflecting emotions observed during a meeting, wherein the emotional information comprises information associated with nonverbal cues of meeting participants. The method may also include determining an engagement level for each participant based on the received information.

Additional objects and advantages of the disclosed embodiments will be set forth in part in the following description, and will be apparent from the description, or may be learned by practice of the embodiments. The objects and advantages of the disclosed embodiments may be realized and attained by the elements and combinations set forth in the claims.

It is to be understood that the foregoing general description and the following detailed description are exemplary and explanatory only and are not restrictive of the invention, as claimed.

BRIEF DESCRIPTION OF THE DRAWINGS

Embodiments and various aspects of the present disclosure are illustrated in the following detailed description and the accompanying figures. Various features shown in the figures are not drawn to scale.

FIG. 12 illustrates an example of managing meeting notes based on nonverbal information, consistent with disclosed embodiments.

FIG. 16 illustrates an example flowchart for a process of managing meeting notes based on nonverbal information, consistent with disclosed embodiments.

DETAILED DESCRIPTION

Reference will now be made in detail to example embodiments, including those illustrated in the accompanying drawings. The following description refers to the accompanying drawings in which the same numbers in different drawings represent the same or similar elements unless otherwise represented. The implementations set forth in the following description of the embodiments do not represent all possible implementations consistent with the invention. Instead, they are merely examples of systems and methods consistent with aspects related to the invention as recited in the appended claims. Particular aspects of the present disclosure are described in greater detail below.

Modern-day devices for managing and composing meeting notes often suffer from an inability to detect and incorporate nonverbal information. These devices do not take nonverbal cues into account when managing meeting notes. There is, therefore, an inability to notate potentially significant information regarding what transpires in a meeting, leading to incomplete meeting notes.

Consistent with embodiments of the present disclosure, systems and methods are provided for managing meeting notes, including managing notes that reflect nonverbal information conveyed during meetings, such as emotions. With embodiments of the present disclosure, a system for managing meeting notes based on emotions may receive nonverbal information associated with the nonverbal cues of participants of a meeting. Consistent with the present disclosure, the system may also determine an engagement level for each of the people in the meeting. The system may then compose meeting notes based on the engagement level.

In some embodiments, the disclosed system may also determine important parts of a meeting based on the engagement levels. The system may also emphasize the parts of the meeting transcript, which correspond to the important parts of the meeting.

In some embodiments, the system may determine aggregate engagement levels across the entire duration of a meeting based on the individual engagement levels of the participants across the entire duration of the meeting. The system may then determine important parts of a meeting based on the determined aggregate engagement levels. The system may then emphasize the parts of the meeting transcript, which correspond to the important parts of the meeting.

In some embodiments, the system for managing meeting notes based on emotions may use machine learning algorithms to determine engagement levels. For example, a machine learning algorithm may be used that determines that, based on certain nonverbal information, a person is highly engaged in a meeting.

Figure 1:
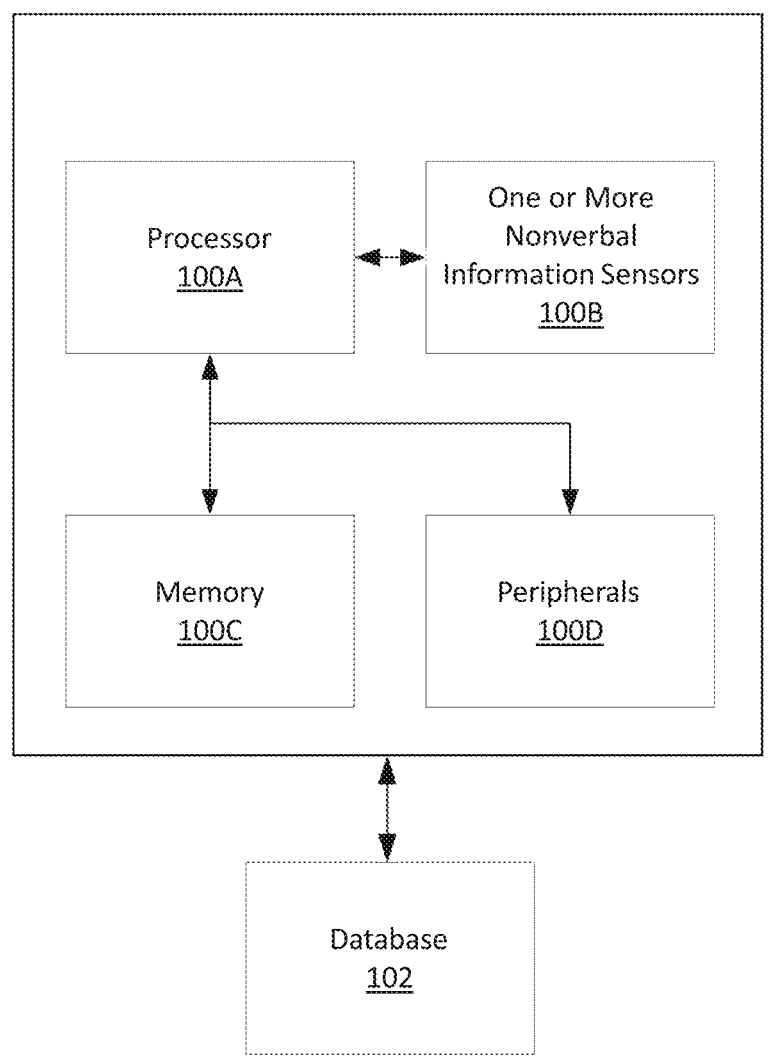
FIG. 1 illustrates an example embodiment of a system for managing meeting notes based on nonverbal information, consistent with disclosed embodiments.

FIG. 1 illustrates an embodiment of a system for managing meeting notes according to the present disclosure. The number and arrangement of components in FIG. 1 are for purposes of illustration and not intended to be limiting to the embodiments of the present disclosure. As shown, the system for managing meeting notes 100 comprises a processor 100A, one or more nonverbal information sensors 100B, memory 100C, peripherals 100D, and database 102. The system for managing meeting notes 100 may receive nonverbal cues through the one or more nonverbal information sensors 100B. The nonverbal cues may be received physically or remotely. For example, the nonverbal cues may comprise vocal information received telephonically through a phone call or a videoconferencing service. Alternatively, the nonverbal cues may comprise facial expression information received through a remote video camera. Nonverbal information sensors may comprise any sensor which may detect nonverbal information. For example, nonverbal information may comprise biometric information, posture information, facial expression information, ocular focus information, vocal tonality information, vocal intensity information, brainwave pattern information, and any other information that may be associated with a nonverbal response from a person. A nonverbal information sensor, therefore, may comprise a camera to detect biometric information, posture information, facial expression information, or ocular focus information. A nonverbal information sensor may also comprise a microphone to detect vocal tonality information or vocal intensity information. Furthermore, a nonverbal information sensor may also comprise a brainwave pattern sensor, brainwave activity monitor, or any device or technology for monitoring and/or recording the electrical activity of the brain or other detectable artifacts of brain activity.

Figure 2:
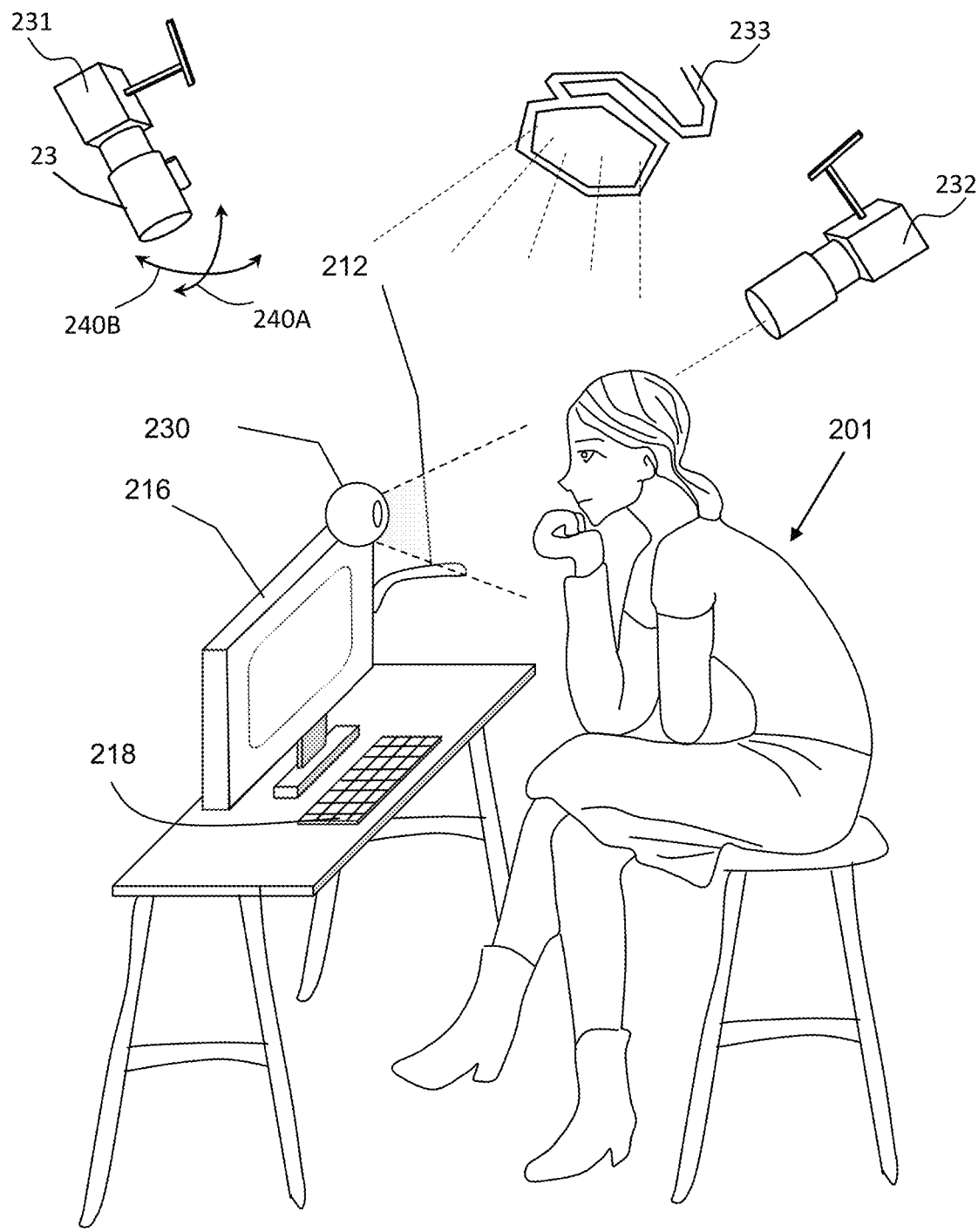
FIG. 2 illustrates example devices for capturing nonverbal information, consistent with disclosed embodiments.

FIG. 2 shows a participant 201 of a meeting that may be conducted using one or more devices such as meeting-related devices 212-236. Devices 212-236 may include a video or audio capturing devices such as a microphone or a camera that may interact/connect wirelessly or by wire, in whole or in part, with a user device such as a smartphone, desktop, or any other device that may be used for conducting a meeting. In some embodiments, more than one capturing device may be used. For example, FIG. 2, shows a participant 201 communicating with other participants via a user device 216 (e.g., a desktop computer shown in FIG. 2). In various embodiments, capturing devices such as cameras 230, 231, and 232 may capture video or image data related to participant 201 (e.g., cameras 230-232 may capture facial expressions of participant 201, a posture of participant 201, movement of participant 201, or any other time-dependent data related to participant 201). As used herein, unless otherwise noted, the term "time-dependent data" may include any suitable audio data (e.g., user voice data, background sound data and/or the like), video data (e.g., video data of facial expressions of the user, video data of body gestures, video data of user's hands, facial image data, iris image data, background image data and/or the like), user input data (e.g., data related to user interacting with an interface of conferencing session such as user clicking on various graphical user interface elements, etc.), vital biometric data (e.g., user blood pressure, pulse, and the like), as well as other biometric data (e.g., user fingerprint data).

FIG. 2 shows some capturing devices 212, 230 and 218 that may be used to obtain the time-dependent input data. For example, device 212 may be a microphone; device 230 may be a camera, and device 218 may be a keyboard. It should be understood that various other capturing devices may be used. For example, a display device 216 (e.g., a computer touch screen, a screen of a tablet or a mobile device, etc.) may be used for capturing a hand gesture of a user. Various devices may be designated to a specific type of time-dependent input data. In some embodiments, a wearable capturing device for recording blood pressure, pulse, blood sugar levels, and/or the like may be used.

Examples of possible capturing devices may further include a visible camera, infrared camera, ultrasound recording device, and the like. While in many instances the capturing device may be a "passive device," that is a device that acquires the signals from an object without actively generating signals, in some embodiments, the capturing device may be an active device. For example, capturing device may be an "active device" if it is configured to emit electromagnetic radiation (e.g., light via photo-flash), emit and detect ultrasound, and/or the like. For example, capturing device may include an infrared laser source or a visible light laser source. Such sources may facilitate measuring distance between the capturing device and participant 201 (e.g., an image capturing camera may measure the distance between the camera and a selected point on the participant's face) and assist in adjusting parameters of the capturing device based on the measured distance to participant 201.

In various embodiments, meeting-related devices may include a display device 216 that may be configured to display various multimedia content communicated during a meeting for participant 201. In some embodiments, display device 216 may include several display devices. In various embodiments, display device 216 may be configured to display video data, and text data associated with the conference, including the data related to interactions between various users.

One or more meeting-related devices (e.g., device 216) may also include one or more software applications that facilitate various meeting-related devices to engage in communications, such as IM, text messages, EMAIL, VoIP, video conferences, with one another to facilitate communication between the participants of a meeting.

In various embodiments, during a meeting, participants may be differentiated. For example, a participant may be chosen to be a presenter. The term "presenter" refers to a participant who is presenting at a meeting (also referred to as a conferencing session). A presenter may share any suitable multimedia content with other participants and, in general, lead the discussion during at least a portion of the meeting.

As used herein, the term "attendee" is used to indicate that a participant is not a presenter at a particular time, that is an attendee may not be configured to lead a presentation by sharing slides, images, and/or the like. In some embodiments, the attendee may ask other participants (e.g., a presenter or other attendees) questions, or provide feedback during a conferencing session. Attendees can become presenters, and presenters can become attendees, as the meeting progresses.

In various embodiments, a meeting may be moderated by a moderator (also referred to as a host). Responsibilities of a moderator may include overall management of the meeting. The moderator may include a moderator device (e.g., a desktop computer, a laptop or a mobile device) running a software application for managing all aspects of the meeting and enabling participants to chat, send video, share information and interact with each other via documents, presentations, whiteboards, applications, and/or the like. Some of the common tasks of a moderator may include recording the meeting, inviting people to the meeting, selecting presenters, selecting another moderator, and sharing various information between the participants. In some embodiments, a moderator may be configured to have a private chat with a participant of the conferencing session, and in some embodiments, a moderator may remove a participant from the conferencing session. In various embodiments, a moderator (or a currently chosen presenter) may select a participant to be a presenter during the conferencing session. It should be noted that a moderator may be a participant in a meeting.

As described above, meeting-related devices may include audio sensors, video/image sensors (e.g., cameras 230-232), as well as various light sources (e.g., a light source 233 is shown in FIG. 2) for facilitating capturing video and audio data during the meeting. In various embodiments, cameras 230-232 may be movable. For example, as shown in FIG. 2, camera 231 may be rotated as indicated by arrows 240A showing a pitch direction, and arrows 240B showing a yaw direction for camera 231. In various embodiments, pitch and yaw angles of cameras (e.g., camera 231) may be controlled such that camera 231 points at a region-of-interest (ROI), such as the face of participant 201 at which video/image data needs to be captured. For example, camera 231 may be configured to track the face of participant 201, a hand of participant 201, a body movement of participant 201, and the like. In various embodiments, camera 231 may be equipped with a laser (e.g., an infrared laser) for precision tracking. In some cases, camera 231 may be tracked automatically via a computer-based camera control application that uses an image recognition algorithm for positioning the camera to capture video/image data at a ROI. In some embodiments, the camera control application may control positions (i.e., yaw and pitch angles) of various cameras (e.g., cameras 230-232) to capture video/image date from different ROIs during a meeting. Additionally, or alternatively, a moderator may control the position of various cameras, and/or the moderator may supervise the camera control application in controlling the position of the cameras. In some cases, cameras 230-232 may be used to capture video/image data from more than one participant in a meeting. For example, if multiple participants are present in a room during the meeting, cameras 230-232 may be configured to capture video/image data from various participants.

Cameras 230-232 may further include zoom lenses for zooming towards one or more ROIs. In an example embodiment, camera 232 may include a zoom lens 235 for zooming closely to a ROI (e.g., participant 201), and camera 231 may include a zoom lens 236 for capturing video/image data from a larger area around the ROI. For example, camera 231 may capture video/image data for multiple participants in a meeting room. In some embodiments, video/image data obtained from camera 231 may be analyzed to identify a ROI (e.g., a face of participant 201), and the camera control application may be configured to cause camera 232 to zoom towards the ROI identified by camera 231. In some cases, camera 231 may capture a first view of participant 201 (e.g., a frontal view of participant 201), and camera 232 may be configured to capture a second view of participant 201 (e.g., a back view of participant 201).

In various embodiments, the camera control application may be configured to coordinate the position and zoom of various cameras during a meeting. For example, the camera control application may direct camera 231 to track the face of participant 201 and may direct camera 231 to track movements of a body of participant 201. In some cases, cameras 231 and 232 may track the same ROI (e.g., the face of a participant) from different view angles.

In various embodiments, control of position and zoom of cameras 230-232 may be rule-based and follow a prescribed algorithm. For example, the camera control application may be configured to direct camera 231 to track the face of participant 201, to direct camera 230 to track eyes of participant 201, and direct camera 232 to track the motion of a body of participant 201. The algorithm may include any suitable logical statements determining position and zoom for cameras 230-232 depending on various events during a meeting. For example, the algorithm may direct at least one camera to a mouth of participant 201 upon determining that participant 201 is laughing (as may be inferred from an audio signal received from participant 201).

In various cases, when a camera (e.g., camera 231) tracks a moving or deforming object (e.g., when camera 231 tracks a feature of a face of participant 201, such as a mouth of participant 201) camera control application may determine a maximum allowable zoom for camera 231, such that the moving or deforming object does not escape a field of view of the camera. In an example embodiment, the camera control application may initially select the first zoom for camera 231, evaluate whether the moving or deforming object escapes the field of view of the camera, and adjust the zoom of the camera as necessary to prevent the moving or deforming object from escaping the field of view of the camera. In various embodiments, the camera zoom may be readjusted based on a direction and a speed of the moving or deforming object.

In various embodiments, moving cameras 230-232 may be used for determining sizes of facial features (or body features) for participant 201 and determining distances between the features using triangulation. For example, by knowing the orientation of cameras 231 and 232 (described by measuring angles for these cameras in an appropriate reference frame), distances from cameras 231 and 232 to facial/body features may be calculated using, for example, the law of sines. Knowing such distances allows determining changes in facial features (e.g., allowing detecting a smile of participant 201). Further, measuring distances between points of a face or a body of participant 201 to one or more cameras may allow determining a point-cloud three-dimensional representation of a face (or a body) of participant 201.

In some embodiments, light sources (e.g., light source 233) may also be movable and track one or more ROIs. In an example embodiment, light source 233 may be rotated by yaw and pitch angles, and in some cases, may extend towards to or away from a ROI (e.g., participant 201). In some cases, light source 233 may include one or more optical elements (e.g., lenses, flat or curved mirrors, and the like) to focus light on the ROI. In some cases, light source 233 may be configured to control the color of the light (e.g., the color of the light may include different types of white light, a light with a selected spectrum, and the like). In an example embodiment, light 233 may be configured such that the spectrum and intensity of the light may vary over a surface of an anatomic structure illuminated by the light. For example, in some cases, light 233 may include infrared wavelengths resulting in warming of at least some portions of the surface of the anatomic structure.

In various embodiments, cameras 230-232 may be ultraviolet cameras or infrared cameras. In some cases, meeting-related devices may include ultrasound sources and detectors. In some cases, such sources and detectors may be used to determine distances to participants of a meeting and/or distances to different facial/body features of the participants.

Figure 3A:
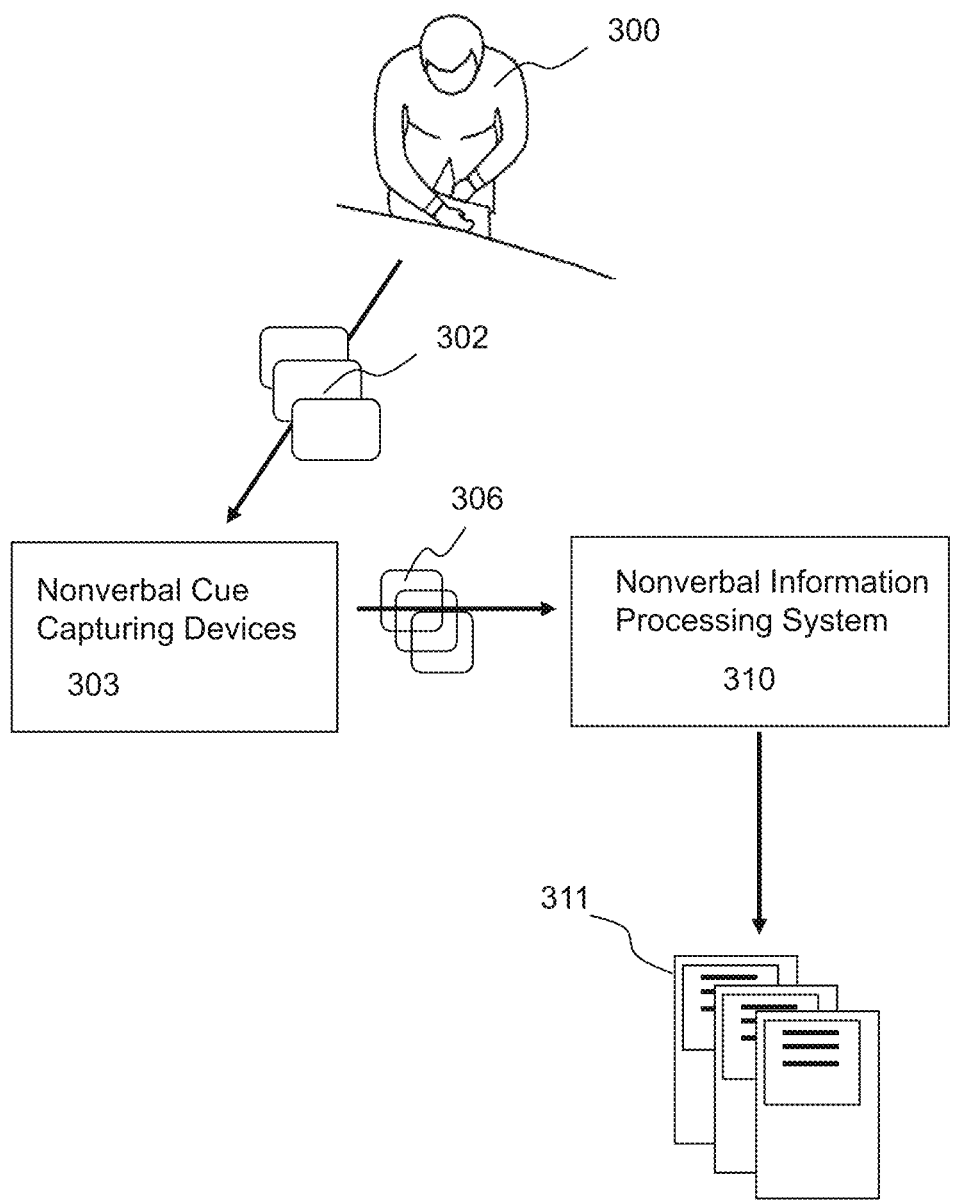
FIG. 3A illustrates an example of an environment for a system for managing meeting notes based on nonverbal information, consistent with disclosed embodiments.

FIG. 3A illustrates an environment in which a system for managing meeting notes based on nonverbal information may operate. The arrangement and number of components are shown for purposes of illustration and not limiting for any purpose. It will be appreciated, for example, that any number of nonverbal information sensors may be used to implement the exemplary embodiment. As shown, an environment for managing meeting notes based on emotions is provided that includes a participant 300, associated nonverbal cues 302, a nonverbal cue capturing devices 303 for capturing data related to cues 302, and a nonverbal information processing system 310 for processing data 306 received from devices 303 and for generating meeting notes 311.

As shown in FIG. 3A, devices 303 may receive nonverbal cues 302 from participant 300. It will be appreciated that nonverbal cues 302 may comprise biometric information, posture information, facial expression information, ocular focus information, vocal tonality information, vocal intensity information, brainwave pattern information, and any other information that may be associated with a nonverbal response from person 300. Biometric information may include information about a person's cardiovascular system, such as heart rate, blood pressure, and vein analysis. Biometric information may also include a rate of breathing, ocular information, and odor. Posture information may include information related to how a person carries their body, such as spinal alignment and position of the person's limbs. Facial expression information may include information about the motion of the muscles of a person's face. Ocular focus information may include information about where a person's eyes are focusing and whether a person's eyes are focusing, such as pupil dilation and direction of gaze. Vocal tonality information may include pitch and inflectional used in speech. Vocal intensity information may include the volume of a person's voice. Brainwave activity information may include frequencies, amplitudes, and phases of macroscopic neural oscillations associated with different patterns of brain activity, or any characteristics of other detectable phenomena associated with brain activity. In response to receiving nonverbal cues 302, devices 303 may capture cues 302 and may generate audio, video or image data 306 describing nonverbal cues 302 associated with person 300.

Data 306 may be processed (e.g., analyzed) by nonverbal information processing system 310 to determine various characteristics of nonverbal cues 302 (herein also referred to as nonverbal information). For example, characteristics of nonverbal cues 302 may include a classification of an emotional response based on nonverbal cues 302 and may also comprise an intensity of the emotional response based on nonverbal cues 302. For example, a classification of emotional responses may be given by a reaction classifier. In an example embodiment, reaction classifiers for an emotional response may be "admiration," "adoration," "aesthetic appreciation," "amusement," "anxiety," "awe," "awkwardness," "anger," "boredom," "calmness," "confusion," "disgust," "empathy," "pain," "envy" "excitement," "fear." "joy," "happiness," "sadness," "surprise," and the like. The reaction classifier may not be limited to an emotional response or emotional state and may show a mental state (e.g., "alertness," "eagerness to participate in a conversation," "engagingness," and the like). In some cases, a mental state may be determined based on an emotional response for a participant. Further, in some cases, reaction classifiers may be related to physical characteristics of a participant reaction (e.g., a loudness of an audio response, a rate of speech, a complexity of the speech, a pitch of the speech, an accent of the speech, or any other measurable characteristic for the speech of the participant). Further, physical characteristics of a participant reaction may include a typing rate for a participant when the participant communicates via text messages, a choice of emoji used with the text messages, a choice of fonts (e.g., when participant uses capital letters), a choice of content, when participant communicates using multimedia content, and the like.

Consistent with present embodiments, emotional response (or mental state) indicated by an appropriate reaction classifier may include a degree of intensity (also referred to as a classifier score, a level of intensity, an intensity amplitude, or intensity) associated with the reaction classifier. For example, data 306 may include information associated with a response of surprise and a degree of intensity associated with the response of surprise. Nonverbal information processing system 310 may analyze data 306, determine reaction classifiers and related levels of intensity for the reaction classifiers and use the determined information for composing meeting notes 311. For example, system 310 may determine a reaction classifier "surprise" from data 306 and compose meeting notes 310 emphasizing a portion of the meeting associated with that reaction classifier. In various embodiments, the reaction classifier for an emotional state may be referred to as an emotional classification, and intensity amplitude for such reaction classifier may be referred to as emotional intensity.

Figure 3B:
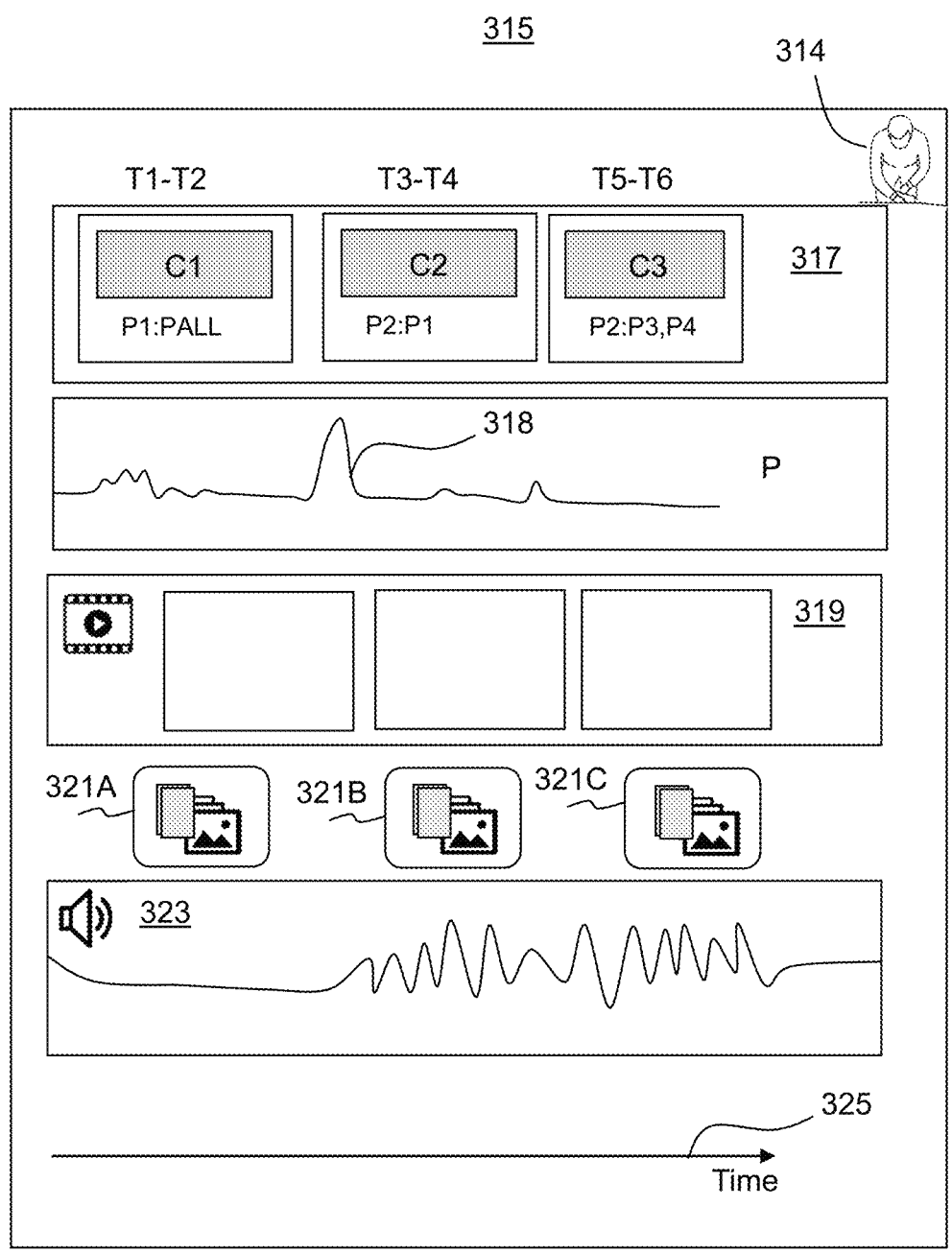
FIG. 3B illustrates an example meeting notes that include nonverbal information, consistent with disclosed embodiments.

As described above, the meeting notes may include any suitable nonverbal information. The term "meeting notes" may refer to any type of image, video, audio, or text data related to a meeting. Such data may include image, video, or audio data captured during the meeting, notes recorded during the meeting, content exchanged during the meeting, or any other data that can be used to characterize the meeting. For example, FIG. 3B shows an exemplary interface 315 that depicts data captured during a meeting at different points in time (as indicated by a time axis 325). For example, interface 315 shows that multimedia content 317 may be captured at different points in time. For example, content C1 (e.g., meeting slides, audio data from other participants, video data from other participants, SMS messages, or any other meeting-related content) may be transmitted during a time interval between time T1 and time T2 from a participant P1 to all other participants (indicated by PALL), content C2 may be transmitted from a participant P2 to participant P1 during a time interval between time T3 and time T4, and content C3 may be transmitted from participant P2 to participants P3 and P4 during a time interval between time T5 and T6.

Additionally, or alternatively, meeting notes may include video data 319 for participants (in an example embodiment, interface 315 may display data for a given participant 314, and interface 315 may be configured to allow selecting a participant for which the data is displayed) audio data 323, image and text data for different points in time (e.g., image and notes data 321A-321C), as well as data 318 indicating an intensity amplitude of a measurable reaction classifier P as a function of time. For example, parameter P may be a loudness level of a participant, a number of words-per-minute spoken by a participant, a measure of a participant emotion (as inferred from audio and video data associated with a participant) as a function of time, a measure of a participant engagement (as inferred from audio and video data associated with a participant) and the like.

Consistent with disclosed embodiments, a reaction classifier may refer to a data that can be used to classify a state (e.g., an emotional state) of a participant during a meeting, particularly if the state of the participant changes due to the participant reacting to information that he/she receives during the meeting. Various reaction classifiers may be obtained for participants during the meeting. Example reaction classifiers may include classifiers related to an emotional state or a mental state of a participant. For example, reaction classifiers related to an emotional state may include frustration with the presentation, anger towards the presentation, enjoyment of the presentation, condescending reaction to a presenter of the presentation, respect to the presenter, and/or the like. As an example, the reaction classifiers related to an intellectual state (also referred to as a mental state) may include an understanding of the presentation, attention to the presentation, or participation in the presentation. It should be noted that reaction classifiers described above are only illustrative, and a variety of other reaction classifiers may be chosen. In some embodiments, reaction classifiers may be identified by a computer system for organizing a meeting (herein referred to as a conferencing system (CS)). For instance, a CS may display various reaction classifiers identified by an emoji icon from various participants during a meeting (herein also referred to as a conferencing session).

In various embodiments, as described before, reaction classifiers may have a classifier score associated with a reaction classifier. For example, a reaction classifier identifying the state of a participant as "happy" may have a score ranging from zero to a hundred where a score of a hundred may indicate great happiness of the participant to a conference material and a score of zero may indicate indifference of the participant to the conference material. As another example, the reaction classifier identifying the state of the participant as "participating" or "engaging" may also have a score ranging from zero to hundred, where a score of zero may indicate that the participant is not participating in the conferencing session. For example, the participant may be asleep, the participant may be not looking at the content related to the conferencing session, or the participant may be actively engaged in an activity that may not be associated with the conferencing session (e.g., the participant may be reading a newspaper).

In some embodiments, a CS may be configured to transmit any suitable data related to a participant during a conferencing session to be stored in a database. In various embodiments, the data stored in the database may be associated with a user profile that may be associated with a participant. In some embodiments, a computer-based software (e.g., a software application on a server) may analyze various data stored in a user profile and evaluate the statistical characteristics of the participant based on various reaction classifiers, and related intensity amplitudes (also referred to as classifier scores) recorded during various conferencing sessions. Such statistical characteristics may indicate behavioral patterns for the participant. For example, the computer-based software may evaluate behavioral patterns based on various reaction classifiers associated with user happiness level and conclude that a participant (e.g., participant 201) appears happy during various conferencing sessions. Such a happy disposition of participant 201 may be a behavior pattern, and participant 201 may have a base-level reaction classifier with an average classifier score that relates to such behavior pattern. For example, if participant 201 appears happy most of the time, an average classifier score for base-level reaction classifier corresponding to happiness may be higher than 50 (with a score of 50 indicating no feelings of happiness or unhappiness). In some embodiments, a computer-based software may determine a base-level reaction classifier for participant 201 with a related base classifier score. For example, participant 201 may be classified as "involved" with a base classifier score (i.e., average classifier score) of fifty. In an example embodiment, when the reaction classifier score is similar to the base reaction classifier score for participant 201, such score may be statistically insignificant. On the other hand, if the reaction classifier score differs substantially from the base reaction classifier score, the difference may be noted by a CS.

In various embodiments, the average classifier score may be obtained in a variety of ways. In an example embodiment, a computer-based software may be configured to obtain the profile data for a participant using a user profile. In some cases, the profile data may include at least one time-dependent classifier score for the reaction classifier recorded during at least one previous conferencing session. In an example embodiment, computing the base classifier score may include obtaining one or more time average values for the one or more time-dependent classifier scores for the reaction classifier, and when more than one-time average value is obtained, averaging the time average values.

In some embodiments, a computer-based software application may be configured to calculate a variance of the reaction classifier. For example, a reaction classifier with a base classifier score of fifty may have a variance of 10, indicating that, on average, a classifier score for the reaction classifier may be different from the base classifier score of fifty by 10. Subsequent classifier scores for the reaction classifier may be normalized by a base classifier score to evaluate significant variation in the classifier score. For example, if during a conferencing session a reaction classifier "involved" may have a classifier score of 48, and the base classifier score is fifty, the normalized score may be computed as 48/50=0.96, and it may be concluded by the compute-based software that the classifier score does not significantly vary from the base classifier score. In an alternative example, when the classifier score is 5, and the normalized score is 5/50=0.1, it may be concluded by the computer-based software that the classifier score is significantly different from the base classifier score. It should be noted that the base classifier score may be significant only when the variance of the classifier score is sufficiently small as compared to the average of the classifier score (i.e., base classifier score). For example, if the variance of the classifier score is on the same order as the base classifier score of fifty, then any classifier score may be equally probable, and the base classifier score may not indicate the significance of the fact that the classifier score is different from the base classifier score In various embodiments, the behavior patterns of a participant may be involuntarily or habitual. For example, the participant may have a recurrent tic, cough, problem in pronouncing certain words, or any other involuntary or habitual behavior patterns (e.g., drumming fingers, interspersing swear words throughout the conversation, etc.), that may be detected by a computer-based software when obtaining reaction classifiers for the participant.

In various embodiments, audio data from a participant (e.g., a question asked by a participant during a conferencing session) may be analyzed via comprehension software to obtain a related reaction classifier. For example, by analyzing audio data from the participant, a reaction classifier related to participant understanding the content of the conferencing session may be evaluated. Various other reaction classifiers may be inferred from the aspects of the audio data. For example, a reaction classifier associated with a lengthy, incomprehensible, vague, or unfocused speech may be identified. In various embodiments, reaction classifiers related to involuntary or habitual behavior patterns may be identified and ignored by a CS, while accounting for such behavior patterns when evaluating classifier scores for various other reaction classifiers (for example, if a participant is known for drumming fingers, such behavior pattern should not influence a reaction classifier for a participant associated with restlessness).

The comprehension software may, for example, analyze the user using a natural language processing to determine the subject matter (or a pattern) of the participant's audio/transcribed data. As used herein, the term "pattern" may refer to various aspects of a speech of a participant that may be identified as a statistically repeating event. For example, a pattern may be observed if a participant is frequently changing the subject of a conversation, or/and if the participant frequently repeats the same information. The comprehension software may determine the subject matter or the pattern of the participants' audio/transcribed data by analyzing the keywords found in transcribed text data or audio data.

Comprehension software may further identify the proficiency level of the user speech, which may correspond to a level of proficiency of the English language or any other suitable language, characterized by vocabulary and grammar usage of the participant. Comprehension software may additionally identify a choice of words (e.g., vocabulary or colloquialisms) for the user and select a related reaction classifier (e.g., a classifier indicating a level of English proficiency).

In various embodiments, comprehension software may machine learning methods such as neural networks, recurrent neural networks (RNN), or convolutional neural networks (CNN) to process the image, video, text, or audio data to identify various features of the data associated with a participant.

In some embodiments, machine learning algorithms (also referred to as machine learning models in the present disclosure) may be trained using training examples, for example, in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes, and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

In some embodiments, trained machine learning algorithms (also referred to as trained machine learning models in the present disclosure) may be used to analyze inputs and generate outputs, for example, in the cases described below. In some examples, a trained machine learning algorithm may be used as an inference model that, when provided with an input, generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value for the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value for an item depicted in the image (such as an estimated property of the item, such as size, volume, age of a person depicted in the image, cost of a product depicted in the image, and so forth). In an additional example, a trained machine learning algorithm may include an image segmentation model, the input may include an image, and the inferred output may include segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs. Some non-limiting examples of such artificial neural networks may comprise shallow artificial neural networks, deep artificial neural networks, feedback artificial neural networks, feed-forward artificial neural networks, autoencoder artificial neural networks, probabilistic artificial neural networks, time delay artificial neural networks, convolutional artificial neural networks, recurrent artificial neural networks, long short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for an artificial neural network and/or the machine learning algorithm, and the machine learning algorithm may use the hyper-parameters and training examples to determine the parameters of the artificial neural network, for example using backpropagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

In some embodiments, analyzing image data (for example by the methods, steps, and systems described herein) may comprise analyzing the image data to obtain a preprocessed image data, and subsequently analyzing the image data and/or the preprocessed image data to obtain the desired outcome. Some non-limiting examples of such image data may include one or more images, videos, frames, footages, 2D image data, 3D image data, and so forth. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a nonlinear function. In some examples, the image data may be preprocessed by smoothing at least parts of the image data, for example, using Gaussian convolution, using a median filter, and so forth. In some examples, the image data may be preprocessed to obtain a different representation of the image data. For example, the preprocessed image data may include a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time-ordered series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some non-limiting examples of such image features may comprise information based on and/or related to edges, corners, blobs, ridges, Scale Invariant Feature Transform (SIFT) features, temporal features, and so forth.

In some embodiments, analyzing image data (for example, by the methods, steps and modules described herein) may comprise analyzing the image data and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result; and so forth. In some embodiments, analyzing image data (for example, by the methods, steps and systems described herein) may comprise analyzing pixels, voxels, point cloud, range data, etc. included in the image data.

In some embodiments, a computer-based software (e.g., a machine learning method) may further analyze the audio characteristics of the participant's audio data. In various embodiments, the software may analyze a pitch, a tone, a cadence of the user speech, volume and a rate of a user speech to extract various characteristics from the speech, such as a tone of voice, emotional content of the speech, or any other aspects that uniquely identify reaction characteristics for a participant based on the audio characteristics of the receiving data. For example, in various embodiments, a computer-based model (e.g., neural network model) may be applied to identify an emotion of the participant from the sequence of the phonemes and to identify an amplitude of the emotion. In various embodiments, a reaction classifier may be assigned to the identified emotion, and a classifier score may be assigned to the identified amplitude of the emotion.

In some embodiments, a computer-based software may identify a gender of the user, an age of the user, a dialect of the user, or an accent of the user speech. It should be noted that even though age, gender, dialect and/or accent of the participant is not a type of classifier that is related to a participant reacting to a content of the conferencing session, nevertheless, for generality, such participant characteristics may be collected and may, for convenience, be labeled as "participant classifiers" emphasizing that these classifiers are not based on a reaction of the participant to the content of the conferencing session.

Consistent with disclosed embodiments, a CS may further include a visual module for obtaining reaction classifiers based on the facial and body expression of a participant. The visual module may include a capturing device that may be a camera (e.g., cameras 230-232, as shown in FIG. 2). In an illustrative embodiment, the visual module may include a processor that may be configured to process and modify recorded video data. For example, the processor may be configured to brighten the video data. In an illustrative embodiment, the visual module may obtain data from several cameras. Different cameras may record videos at different zoom settings and from different directions allowing recording an immersive video. The term "immersive video" also known as the 360-degree video may refer to video recordings where views in multiple directions are recorded at the same time. The video may be shot using an omnidirectional camera or a collection of cameras.

Figure 4:
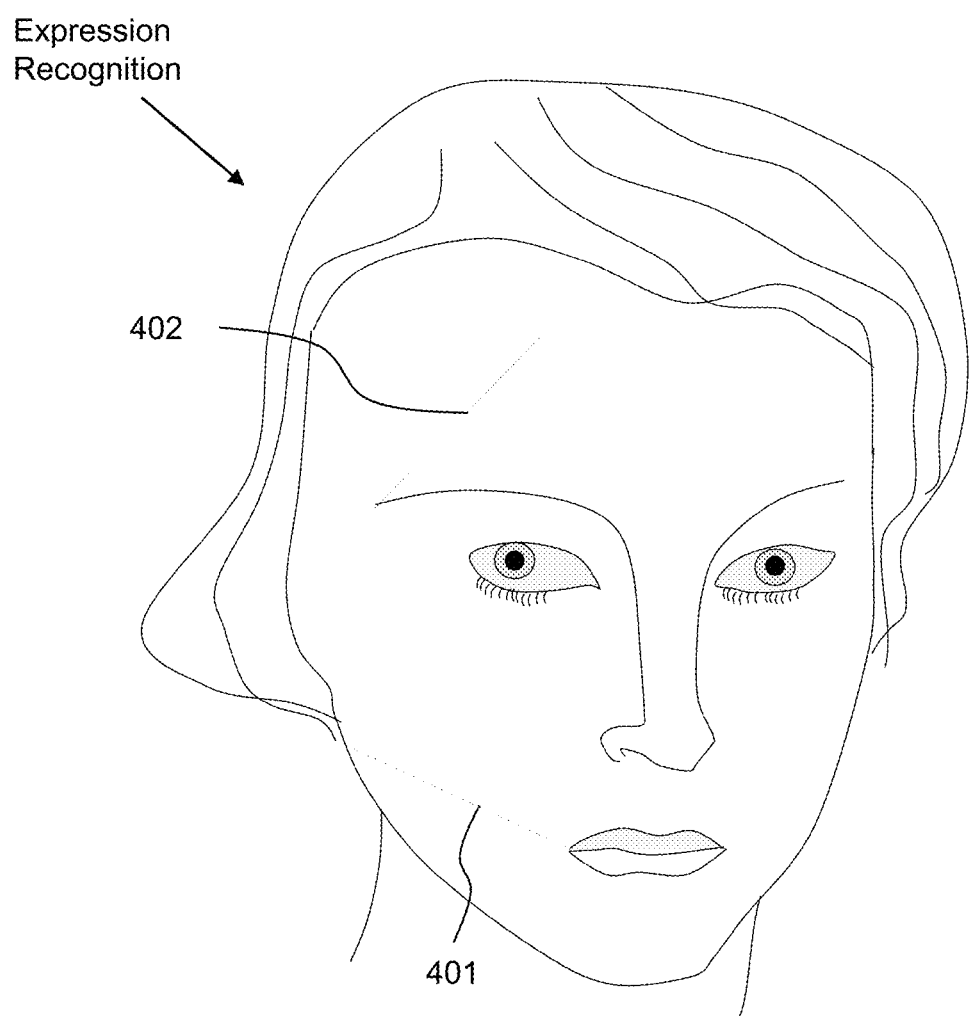
FIG. 4 illustrates an example approach for recognizing nonverbal information based on facial expressions, consistent with disclosed embodiments.

In some embodiments, the visual module may be used to recognize reaction classifiers associated with the participant's emotions. For example, a computer-based neural network model, such as convolutional neural networks (CNNs), may be effective for recognizing emotions in the facial images of the participants. In some embodiments, as shown in FIG. 4, points 401 and distances 402 may be tracked (including tracking motion of points 401 and a change in distances 402) to evaluate the participant's emotions. For example, image analysis software may recognize a smile of a participant, a frown of a participant, a participant's surprise, and/or the like. In various embodiments, image analysis software (also referred to as computer-based model) may analyze time-dependent input data from a participant that may comprise a sequence of images of the face of the participant. The image analysis software may obtain at least one classifier score for a reaction classifier by identifying an emotion of the participant from the sequence of the images and by assigning a reaction classifier to the identified emotion. In various embodiments, image analysis software may identify an amplitude of the emotion, and assigning a classifier score for the identified amplitude. In some embodiments, image analysis software may analyze time-dependent input data from a participant that may comprise a sequence of images of various body gestures (or body positions) of the participant.

In various embodiments, a CS may include a user interface, and a participant may interact with graphical user input elements of the user interface (e.g., buttons, dropdown lists, search fields, command fields, whiteboard, lines, shapes, text fields, etc.) via mouse, keyboard, audio commands, or gestures (e.g., hand gestures such as pan gesture, zoom gesture, etc.). As used herein, such input may be referred to as "action input." For example, action input may include text messages submitted to other participants, sketches and drawings submitted as multimedia content for conferencing session, and/or any other suitable input that uses GUI of the user interface. In various embodiments, the action input of the participant may be transmitted to a server, recorded in a database, be associated with a user profile and may be analyzed by a computer-based software for finding reaction classifiers. As used herein, the term "associated with user profile" when applied to various input data obtained from a participant and stored in a database, indicates that there is a link to the data from a user profile. In some embodiments, the user profile may provide an interface for a user or application programming interface (API) for computer-based models to access various data for the participant.

In various embodiments, various reaction classifiers may be stored in a database and associated with a user profile for one or more conferencing sessions participated by conference attendees. In various embodiments, a computer-based software application for controlling various aspects of a meeting may be configured to transmit various reaction classifiers from various participants to at least one user/participant (e.g., presenter) of the conference or in some cases, the reaction classifiers may be configured to be transmitted to a moderator that may or may not be a participant of the conferencing session. For example, a moderator may be configured to host several conferencing sessions at the same time and may receive only limited multimedia content associated with each conferencing session.

Figure 5:
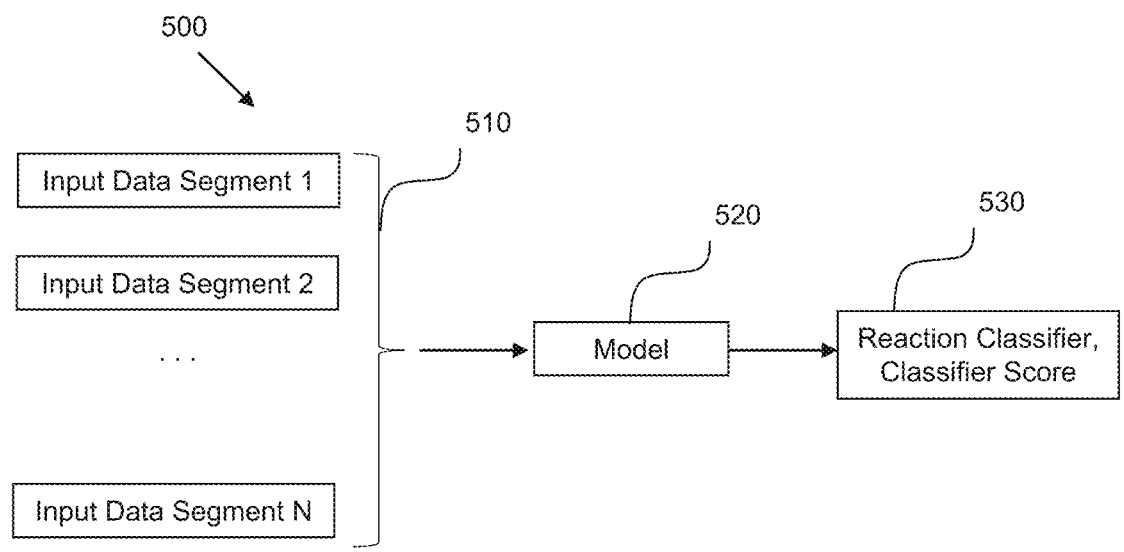
FIG. 5 is an example diagram of a computer-based model for obtaining a classifier score, consistent with disclosed embodiments.

FIG. 5 shows an exemplary process 500 of obtaining a classifier score 530 using a computer-based model 520 for input data 510 represented by a number of individual input data segments 1 through N. In various embodiments, classifier score 530 may be calculated using computer-based model 520 that may include machine-learning models, such as neural networks, decision trees, and models based on ensemble methods, such as random forests. The machine-learning models may have parameters that may be selected for optimizing the performance of model 520. For example, parameters specific to a particular type of model (e.g., the number of features and number of layers in a neural network) may be optimized to improve the model's performance. In some embodiments, as shown, for example, in FIG. 5 model 520 may return a reaction classifier and a classifier score corresponding to the reaction classifier. For example, the reaction classifier returned by model 520 may be used to identify a facial expression (e.g., happy, or sad expression). In some embodiments, the classifier score may be characterized by a single number, and in some embodiments, model 520 may return a probability distribution of possible classifier scores 530. It should be noted that model 520 may be designed for a specific type of input and a specific reaction classifier. For example, model 520 may be designed to analyze images of a participants face and to determine a reaction classifier associated with the participant's facial expressions. Additionally, or alternatively, model 520 may be used for to analyze audio data such as a speech of a participant and to determine reaction classifier associated with various attributes of participant's speech (e.g., pitch of the speech, loudness of the speech, a tone, a cadence of the user speech, and the like). In some embodiments, reaction classifiers may be associated with various known expressions, and model 520 may be configured to return an appropriate reaction classifier when it recognizes the known expression. For example, if a participant uses an expression "we had a productive meeting," model 520 may determine that a participant has a favorable perception of the conferencing session (i.e., a participant is happy).

In some embodiments, model 520 may include a set of interacting models that can simultaneously process audio and video data as well as data related to participants 102 interacting with CS (i.e., action inputs associated with participant's screen gestures, participant's chat, or participants interacting with GUI elements). In an example embodiment, a first model within the set of interacting models may process audio data of a first participant and extract known expressions from the data. For example, the first model may recognize words and phrases "I am sorry," "unacceptable," "I prefer a different approach," and the like, and may output a reaction classifier "unhappy." This reaction classifier may be used by a second model within the set of interacting models that may process video data related to the first participant (or related to a participant interacting with the first participant). For example, if the first classifier is "unhappy," the second model may confirm or repudiate the first classifier. Additionally, or alternatively, the second model may calculate a classifier score for the first reaction classifier. It should be noted, that in addition to recognizing reaction classifiers, interacting models within the set of models may analyze video/audio and action input to get information that may be used by a CS in a variety of ways. For example, an interactive model may be configured to use facial recognition to recognize a participant of the conferencing session. Once the participant has been recognized, a CS may be configured to access user profile data and evaluate the statistical characteristics of the participant based on various reaction classifiers and related classifier scores found in the user profile.

Figure 6:
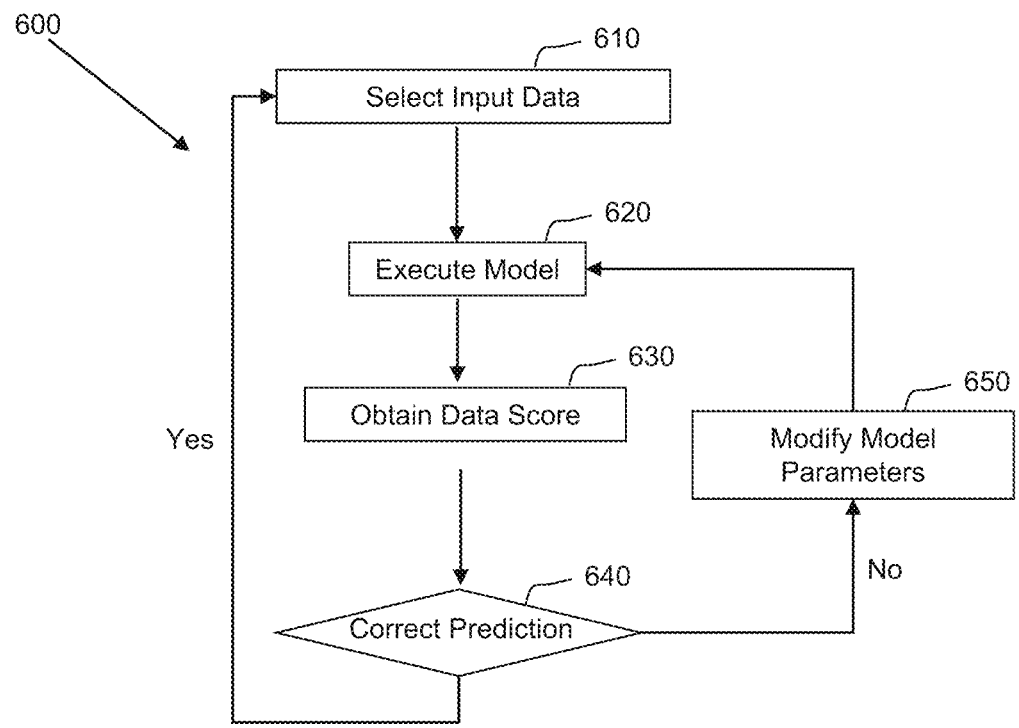
FIG. 6 is a flowchart of an example process of training computer-based models, consistent with disclosed embodiments.

In various embodiments, model 520 may be trained using a data set containing information related to input data and related classifier score 530 that may have been previously computed for the input data. FIG. 6 shows an example embodiment of process 600 for training model 520. At step 610, training data is selected for training the model. In various embodiments, the training data may include a set of data records with each data record containing an image of a face with the image having a reaction classifier (e.g., happiness) and a corresponding reaction classifier score. In some embodiments, a training dataset may include a variety of images related to facial expressions (e.g., happy facial expressions such as smile, a sad facial expression such as frown and the like). The training data containing images of a face with a reaction classifier described here is only illustrative, and various other types of training data may be used. For example, training data may include happy audio/verbal reactions (e.g., laugh) or sad audio verbal reactions (e.g., audible crying).

In various embodiments, model 520 may receive simultaneously multiple types of training data. For example, model 520 receives as an input a facial expression corresponding to a laughing face, an audio reaction corresponding to laugh, and a reaction classifier associated with such data (e.g., reaction classifier corresponding to happiness with a high classifier score).

In various embodiments, training data may include multiple data records, with each record processed consecutively by model 520. At step 610 of process 600, model 520 can acquire a training data record, at step 620 perform computations, and at step 630, return a predicted classifier score. In various embodiments, the predicted classifier score may be compared with the classifier score contained within the data record to evaluate an associated error for model 520 at step 640. If the error is below the threshold value (step 640, NO), process 600 may proceed to step 610 of acquiring a next training data record. If the error is above the threshold value (step 640, YES), process 600 may proceed to step 650 of modifying model parameters and subsequently returning to step 620. In various embodiments, model 520 may be rated based on the average error generated by model 520. In various embodiments, model 520 may be tailored for each reaction classifier and each type of input data.

In various embodiments, model 520 may be a rule-based model for evaluating a reaction classifier. In an example embodiment, model 520 may be used to recognize the reaction classifier associated with human emotion. For example, model 520 may be based on the facial action coding system (FACS) that can be used to classify human facial movements by their appearance on the face of a person. FACS may be used to systematically categorize the physical expression of emotions. In various embodiments, FACS can be used to deconstruct a facial expression into specific action units. The action units may be related to contraction or relaxation of one or more of facial muscles. In an example embodiment, FACS can be used to distinguish various types of smiles based on a contraction of facial muscles (e.g., an insincere smile may include contraction of zygomatic major, and an involuntary smile may include contraction of the zygomatic major and inferior part of orbicularis oculi). Additionally, or alternatively, model 520 may be configured to track a movement of facial points (e.g., selected points on the face of a participant). For example, such points may be points around eyes, nose, lips, eyelids, chin, cheek, forehead, and/or the like. Model 520 may also calculate the distances between each pair of points and the angle made by each pair with a chosen axis (e.g., horizontal axis). In various embodiments, model 520 may correlate the emotion experienced by a participant with the position of the facial points, the distances between the points, and/or the movement of the points.

In various embodiments, multiple computer-based models may be used to recognize the emotion experienced by a participant. For example, a first computer-base model may be used to recognize the emotion associated with audio data for a participant, and a second computer-based model may be used to recognize the emotion associated with video data for the participant. In some embodiments, the first and the second computer-based model may assign a likelihood value (e.g., a probability value) for recognizing the emotion that may range between zero and one. In various embodiments, a correlation between the result from the first and the second computer-based model may be used to increase the probability that the emotion is correctly recognized.

It should be noted that the rule-based computer-based model may be used to evaluate various reaction classifiers (e.g., the reaction classifiers not related to human emotions). For example, to evaluate a reaction classifier related to a participation of a participant during a conferencing session, a computer-based model may evaluate a number of questions answered by a participant, a number of questions asked by participant 102, feedback from participant 102, and/or the like.

Figure 7A:
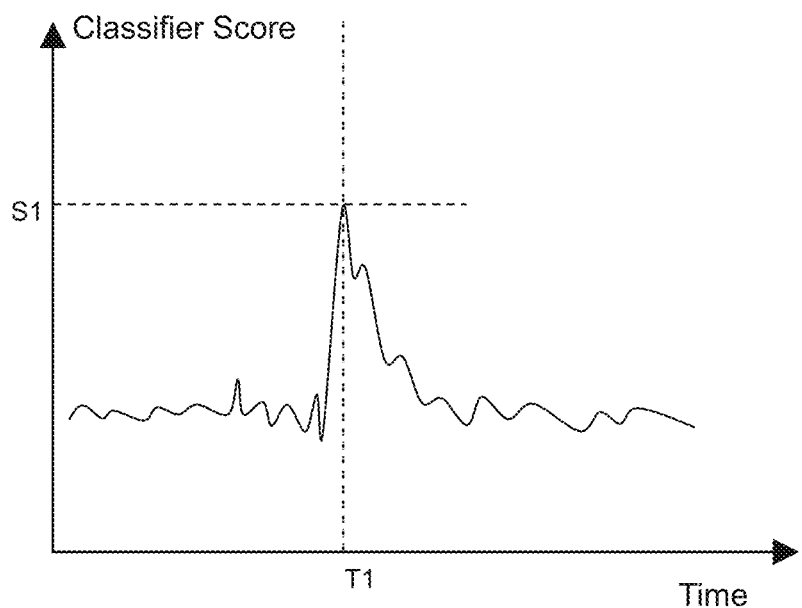
FIGS. 7A and 7B are illustrative graphs of time-dependent classifier score, consistent with disclosed embodiments.
Figure 7B:
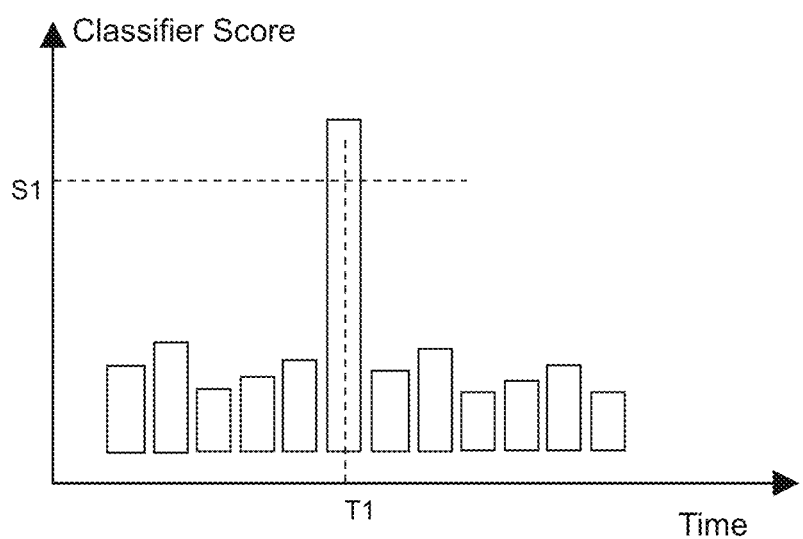

In various embodiments, model 520 may plot a classifier score for a reaction classifier. For example, a reaction classifier "attention" may be related to how much attention a participant is paying to the content of the conferencing session. FIGS. 7A and 7B may show variations in the classifier score as a function of time. For example, in FIG. 7A, the classifier score may be evaluated continuously with time and in FIG. 7B, the classifier score may be evaluated discretely at certain time points (or time intervals). FIGS. 7A and 7B show that the classifier score may exhibit a peak at a time $T_1$ and obtain a value $S_1$ as shown in FIGS. 7A and 7B.

Figure 8:
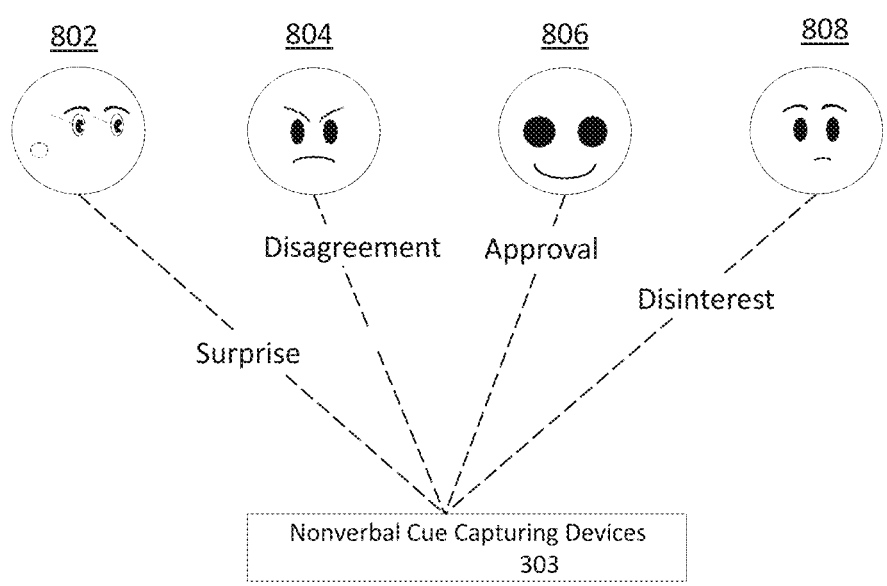
FIG. 8 shows example nonverbal information that may be captured by a nonverbal information sensor, consistent with disclosed embodiments.

FIG. 8 illustrates exemplary nonverbal cues that may be captured by devices 303. It will be appreciated, for example, that many kinds of nonverbal cues may be used to implement the example embodiment, not just facial expressions. Additionally, it will be appreciated, for example, that many different facial expressions and associated classifications may be used to implement the exemplary embodiment. In some embodiments, more than one nonverbal cue may be associated with the same emotional information. In some embodiments, emotional information may also include the intensity of an emotional reaction based on the nonverbal cues. As described above, nonverbal information may describe an emotional or mental state of a participant. In some cases, nonverbal information may be determined by analyzing the facial expressions of a participant. Example facial expressions may include a surprise 802, annoyance 804, satisfaction 806, or indifference 808, as schematically indicated in FIG. 8. These expressions may be detected using nonverbal cue capturing devices 303, which may, for example, be a visible camera, an infrared camera, a microphone, a tactile sensor, or any other suitable sensor (e.g., sensor for measuring biometric information, such as pulse, blood pressure, temperature, breathing rate, skin conductivity, dilation of eye pupils, and the like). In some cases, devices 303 may detect reaction (and reaction time) of a participant to a stimulus (e.g., an appearance of an image on a screen of device 216 (shown in FIG. 2), an audio stimulus, a reaction to a particular word or phrase, and the like). In various embodiments, devices 303 may detect nonverbal data and transmit the data for further data analysis, where the data analysis may be performed using any suitable computer-based software, such as, for example, a machine learning model.

Figure 9A:
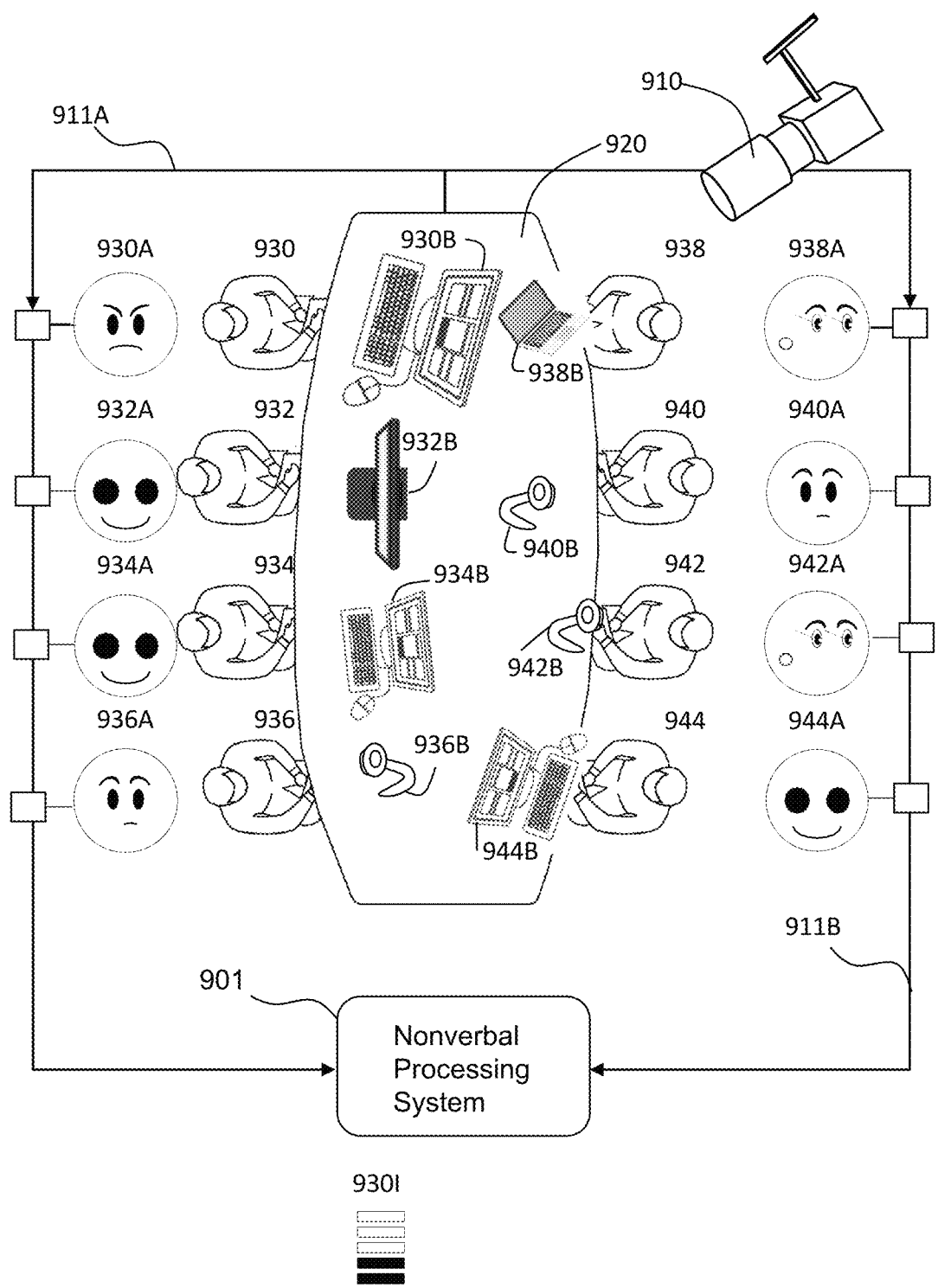
FIG. 9A shows an example process of capturing nonverbal information and processing nonverbal information, consistent with disclosed embodiments.

FIG. 9A, shows participants 930-944 in a meeting room having adjacent corresponding user devices 930B-944B positioned on (or in proximity) of table 920. In various embodiments, devices 930B-944B may have data sensors (e.g., image, video, or audio sensors) for sensing nonverbal cues (e.g., nonverbal cues observed at a given point in time are represented schematically by icons 930A-944A). In some cases, at least one of devices 930B-944B may be configured to have one or more data sensors. For example, device 930B may have a build-in camera and/or a microphone. In some embodiments, a meeting room may have one or more cameras or microphones placed above participants 930-944, adjacent to participants 930-944, next to one or more walls of the meeting room, or at any other suitable location within the meeting room. An exemplary camera 910 is shown in FIG. 9A, and may be configured to capture video, image, and audio data related to all (or some) participants 930-944 located in the meeting room.

Consistent with disclosed embodiments, nonverbal cues may be received from one or more devices (e.g., camera 910) configured to capture cues of multiple participants (e.g., participants 930-944) in a conference room in which a meeting may be conducted. Additionally. or alternatively, some of the nonverbal cues may be obtained from user devices based on proximity of a participant to a user device. In some cases, when a user includes a wearable device, such as device 924, as shown in FIG. 9B, a near field communication between wearable device 924 and a user device (e.g., device 930B) may be used to establish the proximity of a participant (e.g., participant 930) to device 930B.

As described above, nonverbal cues may be any suitable cues indicating the emotional or mental state of a participant in the meeting room. For instance, FIG. 9A shows that at a given point in time participant 930 may have a facial expression 930A indicating disagreement, participants 932, 944, and 934 may have a smile 932A, 944A, and 934A, participants 936 and 940 may have facial expressions 936A and 940A indicating disinterest, and participants 938 and 942 may have surprised facial expressions 938A and 942A.

In various embodiments, data captured by one or more devices 930B-944B as well as sensors within a meeting room (e.g., camera 910) may be transmitted to a nonverbal processing system 901, via network connections such as 911A and 911B, as shown in FIG. 9. Nonverbal processing system 901 may be the same as system 311, as shown in FIG. 3A. System 901 may be configured to process the captured data to determine reaction classifiers and related intensity levels, as described above. In some cases, captured data may be partially (or entirely) processed by processors of at least some of user devices 930B-944B. For example, user devices 930B-944B may include image recognition software application for determining reaction classifiers and intensity levels for the reaction classifiers from video data captured by user devices 930B-944B.

Figure 9B:
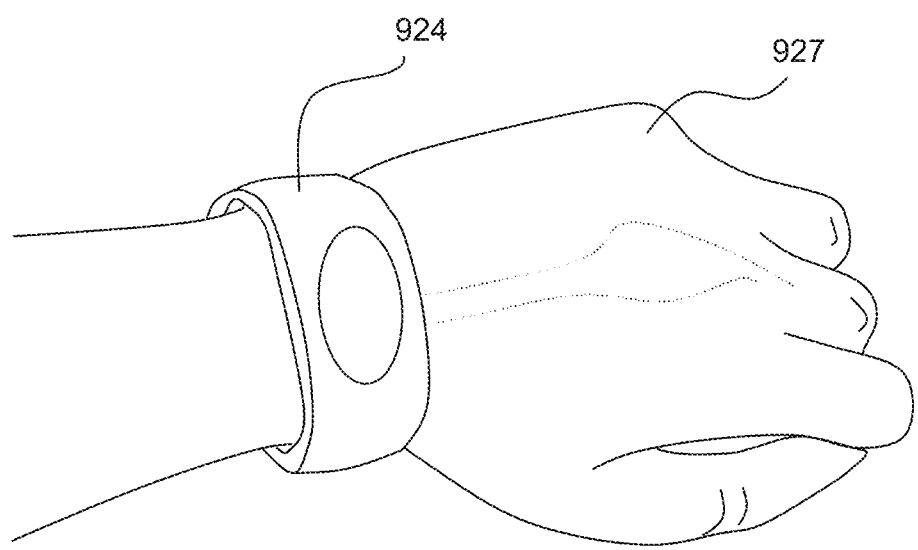
FIG. 9B shows an example device for capturing biometric information, consistent with disclosed embodiments.

FIG. 9B shows an example embodiment when a user device may be a biometric recording device such as a bracelet 924 located on a hand 927 of a participant. Other biometric recording devices may include a heart monitor, sugar level monitor, thermometer (e.g., a thermometer may be located in bracelet 924, motion sensors, or any other suitable biometrics monitors).

In some embodiments, an intensity associated with nonverbal information for a participant may be used in determining an engagement level for the person at the given point in time. For example, nonverbal cue 930A may be received by nonverbal processing system 901, causing system 901 to generate nonverbal information, such as reaction classifiers and intensity 9301, which may, for example, indicate a level of disagreement (as indicated by icon 930A) for participant 930. Intensity 9301 may, for example, correspond to two out of five on an intensity scale for emotion "disagreement," or a low level of intensity. In various embodiments, system 901 may be configured to measure intensity for participants 930-944 for emotions characterized by facial expressions (e.g., expressions 930A-944A). In some embodiments, a threshold level of intensity for nonverbal information may be used for determining engagement. For example, an intensity level of three or higher out of five on an intensity scale may correspond to an engagement, whereas an intensity level below three out of five on an intensity scale may correspond to a lack of interest. In various embodiments, nonverbal information for a participant being engaged may be transmitted to a database and stored for further consideration when composing meeting notes. In various embodiments, intensities for nonverbal information may correspond to a classifier score for a reaction classifier, as discussed above (e.g., reaction classifier may represent the same information as the nonverbal information).

Figure 9C:
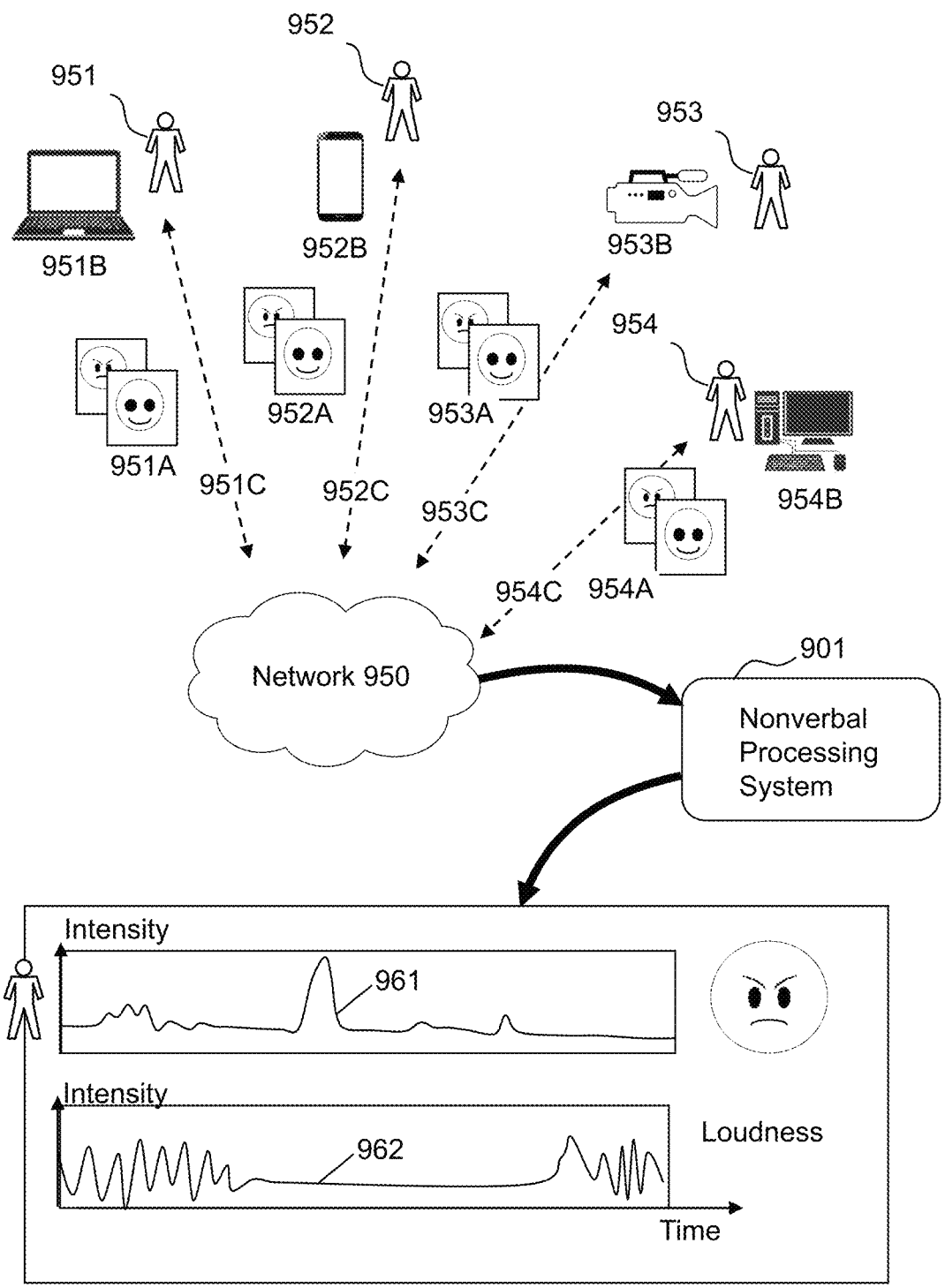
FIG. 9C shows another example process of capturing nonverbal information and processing nonverbal information, consistent with disclosed embodiments.

FIG. 9C shows an example meeting for participants 951-954 interacting with each other via network 950 and connections 951C-954C, using devices 951B-954B. In various embodiments, nonverbal information 951A-954A corresponding to participants 951-954 may be transmitted over network 950 and processed by nonverbal processing system 901. In an example embodiment, for a given user, system 901 may be configured to output the intensity of nonverbal information as a function of time. For example, system 901 may be configured to output intensity 961 for an emotion associated with a disagreement for a given participant, and intensity 962 associated with the loudness of a participant, as a function of time.

Figure 10:
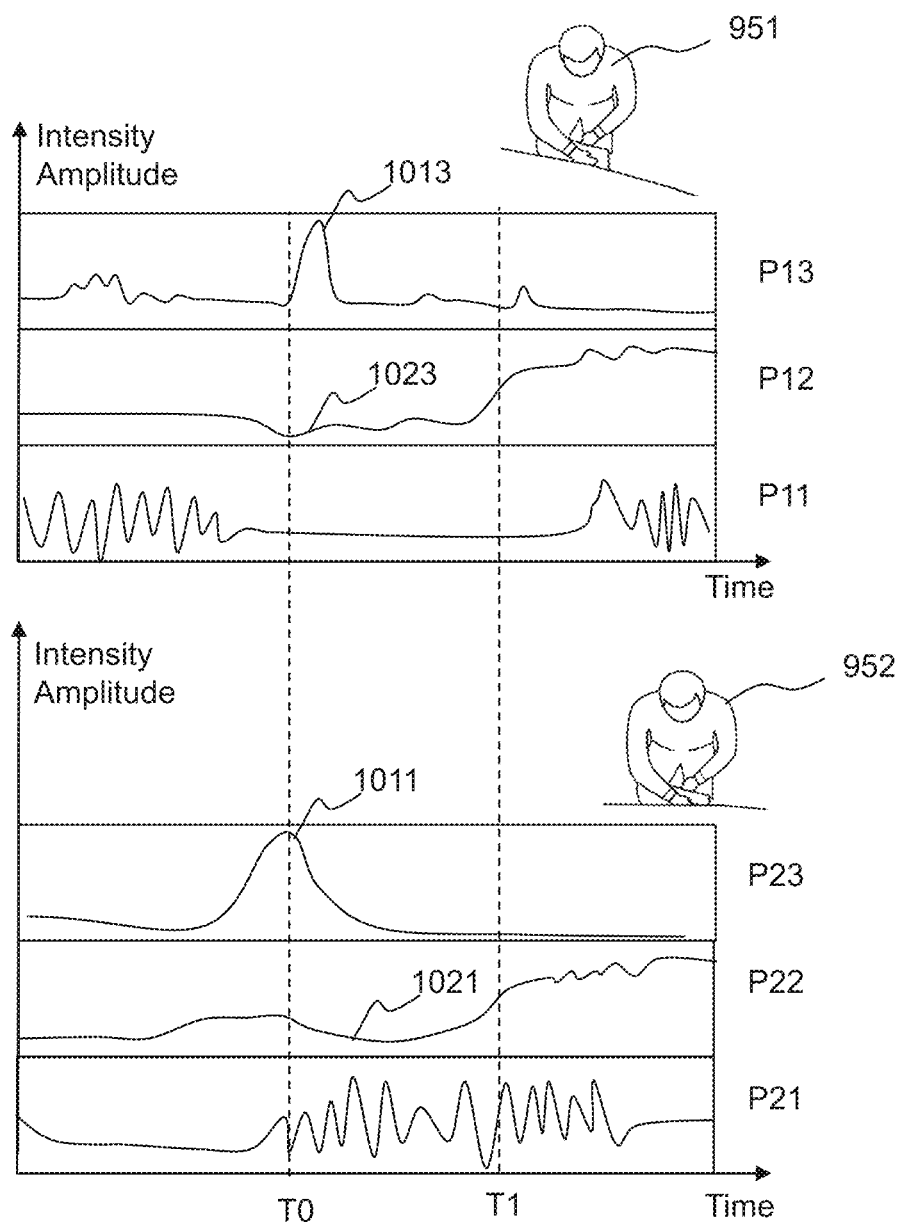
FIG. 10 shows graphs of intensity amplitude for various reaction classifiers, consistent with disclosed embodiments.

FIG. 10, shows example intensity amplitudes for two different participants 951 and 952, for several nonverbal reaction classifiers P11-P13 for participant 951, and reaction classifiers P21-P23 for participant 952. For example, reaction classifier P11 and P21 may correspond to variation in a pitch of a participant when the participant is speaking, reaction classifier P12 and P22 may correspond to the loudness of a speech, and reaction classifier P13 and P23 may correspond to an emotion of anger. For example, at time T0, participant 952 may experience an elevated emotion of anger (characterized by a peak 1011), and participant 951 may have an elevated emotion of anger (characterized by a peak 1013) shortly after emotion of anger of participant 952 (peak 1013 is later in time than time T0 that corresponds to peak 1011). As shown in FIG. 10, at time T1, both participants 951 and 952 have elevated loudness as shown by graphs 1023 and 1021. Displaying intensity amplitudes as a function of time for several participants may allow establishing correlations between reaction classifiers of different participants.

Figure 11:
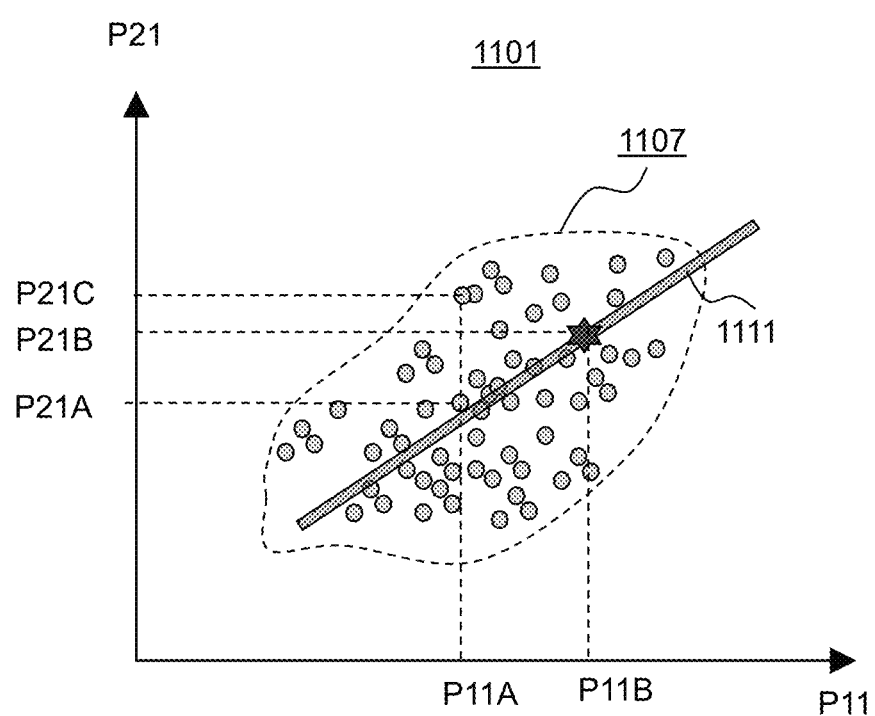
FIG. 11 shows a correlation plot for reaction classifiers, consistent with disclosed embodiments.

An example correlation between a classifier score (or intensity amplitude) for a reaction classifier P11 and a classifier score for a reaction classifier P21 is shown in FIG. 11. For example, for a classifier score P11A that may be observed at several points in time (e.g., two points in time) during a meeting, there may be two classifier scores P21A and P21C for reaction classifier P21, as shown in FIG. 11. In various embodiments, for a cloud of points 1107, a linear regression 1111 may be constructed, as shown in FIG. 11, and regression 1111 may be used to estimate classifier score P21B for a classifier score P11B, as shown using regression 1111.

In some cases, correlation between a classifier score of one user/participant (e.g., participant 951) and a classifier score of another user/participant (e.g., participant 952) may be an important indication that a change in these scores is caused by an event presented during meeting that influences both participants 951 and 952. If correlation between participants is not observed, changes in the classifier score for one of the participants (e.g., participant 951) may be due to other factors that may not be directly related to an event of a meeting (for example, the change in the classifier score of being "alert" may be due to participant 951 drinking coffee). It should be noted that various correlations may be evaluated by analyzing reaction classifiers having time-dependent classifier scores, and such correlations may be transmitted to various participants based on their permission configurations. In an example embodiment, a reaction classifier may be observed for a participant and correlated with a type of content of the conferencing session. For instance, if a specific content of conferencing session results in a participant exhibiting a reaction classifier "upset" corresponding to the participant being upset with the specific content, such correlation may be transmitted to a computer-based software for recording and storing nonverbal information for the purpose of providing meeting notes after a completion of a meeting.

FIG. 12 illustrates an example of managing meeting notes based on nonverbal information, consistent with embodiments of the disclosure. The arrangement and number of elements are depicted for purposes of illustration and not limiting for any purpose. It will be appreciated, for example, that any quantity of meeting notes may be composed for a given person or a given meeting. Additionally, it will be appreciated, for example, that the indication of the intensity of nonverbal information may be presented by any means of formatting, arrangement, or other means of management of the meeting notes and is not limited to bolding a section of the meeting notes. In various embodiments, meeting notes may include intensity amplitudes (i.e., classier scores) for a given reaction classifier as a function of time, as well as various statistics associated with intensity amplitude (e.g., an average intensity amplitude, a deviation for an intensity amplitude, and the like). The meeting notes may show various information related to different participants. For example, intensity amplitudes may be determined for different participants for different reaction classifiers. In various embodiments, high values for intensity amplitudes for a given time interval for a given participant during a meeting may indicate that events of a meeting during that time interval may be important for the participant.

As shown in FIG. 12, meetings notes 1200C-1214C may each respectively include meeting notes sections 1200D-1214D. Meeting notes sections 1200D-1214D may represent a part of a meeting, such as the given point of time of a meeting. Each of the meeting notes 1200C-1214C may respectively be associated with each of corresponding participants 930-944, as shown in FIG. 9A. For example, meeting notes section 1200D may correspond with person 930 at the given time of the meeting illustrated in FIG. 9A. In some cases, meeting notes may include mentions of participants that have similar emotions for a given time interval, or for whom classifier scores for the same reaction classifier are similar, for a given time interval.

As shown in FIG. 12, the meeting notes may be based on nonverbal information (e.g., reaction classifiers) for each participant, including intensities associated with the reaction classifiers. Therefore, meeting notes sections 1200D-1214D may be formatted, arranged, or otherwise managed according to the nonverbal information. For example, if intensities for notes 1200C, 1202C, 1208C and 1214C are moderately high or high, the sections of the meeting notes 1200D, 1202D, 1208D, and 1214D associated with those intensities at the given point in time are bolded to emphasize the contents or differently marked.

In some embodiments, meeting notes 1200C-1214C may include information describing average emotions for a statement made during a meeting. In some cases, notes 1200C-1214C may indicate emotions associated with each (or at least some) participants, or may describe which participants had similar emotions. Any other emotional information or information about reaction classifiers associated with any suitable time or time interval during a meeting may be recorded in meeting notes 1200C-1214C. In various embodiments, any suitable analysis data (e.g., average emotions between participants, average emotions within a time interval of a meeting, the average deviation of emotions between participants, and the like) may be determined and recorded in meeting notes 1200C-1214C.

In some embodiments, managing meeting notes may be based on both intensity and the corresponding emotional classification. For example, although the nonverbal cue 934A associated with person 934 may indicate approval, the corresponding section of meeting notes 1204D may not be emphasized because the corresponding intensity may be too low. By way of another example, although intensity associated with person 930 may correspond to high emotional intensity, the corresponding section of meeting notes 1200D may not be emphasized because the associated nonverbal cue 930A indicates disagreement. One of ordinary skill in the art would appreciate that many different methods of weighing emotional classification and emotional intensity may be used to determine whether to emphasize a certain section of meeting notes. In some cases, when managing meeting notes sections of meeting notes may be emphasized when a participant is "engaged." In some cases, emotional information or any other information associated with any other reaction classifiers for the "engaged" participant may be entered into meeting notes, and the emotional information or any other information associated with any other reaction classifiers may not be entered into meeting notes if a participant is determined to be "not engaged."

In some embodiments, managing meeting notes may be based on a transcript of a meeting. For example, conversations associated with various participants of a meeting may be transcribed and different markings may be used to indicated reaction classifiers associated with various transcribed statements. In some cases, markings may include emojis, icons, pictures, or any other suitable markings indicating reaction classifiers associated with the emotional or mental state for all (or at least some) of the participants of a meeting.

In various embodiments, managing meeting notes may include determining one or more important parts of a meeting for each of the one meeting participants based on the determined engagement levels for at least one of the one or more meeting participants. In some cases, managing meeting notes may include emphasizing parts of the transcript corresponding to the one or more important parts of the meeting. For example, markings for the transcript may include a numerical value indicating the importance of a part of a meeting. For example, the importance may be indicated by a value that ranges from zero to a hundred with zero indicating low importance and a hundred indicating maximum importance. The markings may be any suitable markings that may emphasize parts of the transcript corresponding with the one or more important parts of the meeting. In an example embodiment, emphasizing parts of the transcript may include arranging the parts of the transcript corresponding to the one or more important parts of the meeting at the top of the meeting notes, bolding the parts of the transcript corresponding to the one or more important parts of the meeting in the meeting notes, or underlining the parts of the transcript corresponding to the one or more important parts of the meeting in the meeting notes.

In some embodiments, the meeting may not be a physical or in-person meeting with all people present in one room but may be conducted over a telephone, videoconference, or any other means of remotely conducting a meeting. Additionally, portions of the meeting may be conducted in a physical location while some people may join the meeting remotely.

For example, participants 951-954 may communicate with each other using any suitable wired or wireless telecommunications.

Figure 13:
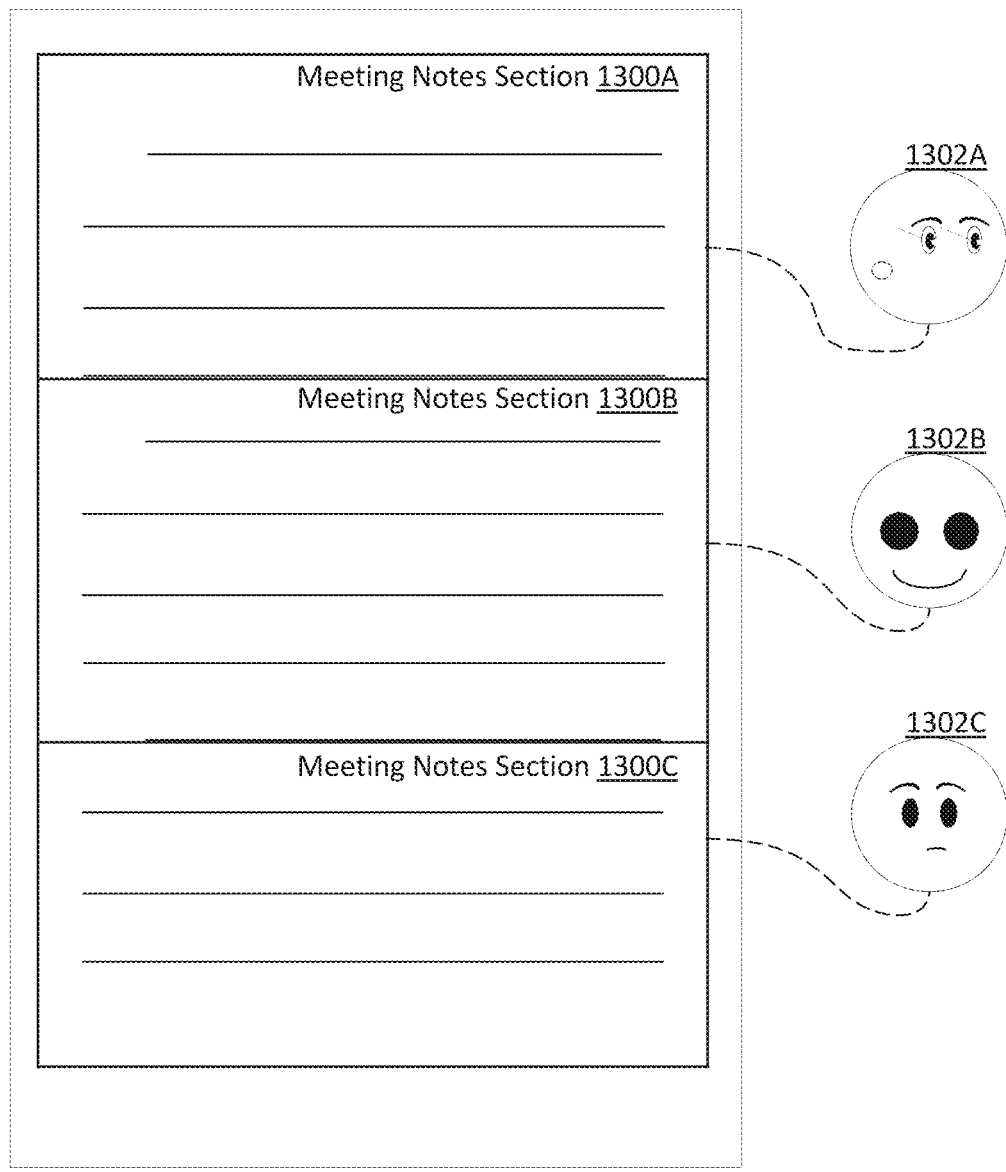
FIG. 13 illustrates another example of managing meeting notes based on nonverbal information, consistent with embodiments of the disclosure.

FIG. 13 illustrates another example of managing meeting notes based on nonverbal information, consistent with embodiments of the disclosure. The arrangement and number of elements are depicted for purposes of illustration and not limiting for any purpose. It will be appreciated, for example, that any quantity of meeting notes may be composed for a given person or a given meeting. Additionally, it will be appreciated, for example, that the indication of nonverbal intensity may be presented by any means of formatting, arrangement, or other means of management of the meeting notes and is not limited to arranging sections of the meeting notes according to importance.

As shown in FIG. 13, meeting notes 1300 may comprise meeting notes sections 1300A-1300C. Furthermore, each of meeting notes sections 1300A-1300C may be associated with each of nonverbal cues 1302A-1302C. As shown in FIG. 13, meeting notes sections 1300A-1300C are arranged according to nonverbal information associated with each of nonverbal cues 1302A-1302C. For example, meeting notes section 1300A corresponds with nonverbal cue 1302A, which may indicate surprise or astonishment in the participant. This emotional reaction may, therefore, cause the associated portion of the meeting to be classified as an important part of the meeting to this person. Consequently, managing meeting notes may comprise arranging meeting notes section 1300A at the top of meeting notes 1300 to indicate its importance. Additionally, meeting notes section 1300B corresponds with nonverbal cue 1302B, which may indicate happiness or satisfaction in the participant. This emotional reaction may, therefore, cause the associated portion of the meeting to be classified as an important part of the meeting to this person. An indication of happiness or satisfaction, however, may not be as significant as an indication of surprise or astonishment. Consequently, managing meeting notes may comprise arranging meeting notes section 1300B below meeting notes section 1300A to indicate a lower level of importance. Furthermore, meeting notes section 1300C corresponds with nonverbal cue 1302C, which may indicate confusion or indifference in the participant. This emotional reaction may, therefore, cause the associated portion of the meeting to be classified as an unimportant part of the meeting to this person. Consequently, managing meeting notes may comprise arranging meeting notes section 1300C at the bottom of meeting notes 1300 to indicate its lack of importance.

In some embodiments, the arrangement of meetings notes sections may be based on an emotional intensity as well as emotional classification. For example, if an emotional intensity associated with nonverbal cue 1302B is higher than an emotional intensity associated with nonverbal cue 1302A, managing meeting notes may comprise arranging meeting notes section 1300B above meetings notes section 1300A to indicate a higher level of importance.

In some embodiments, reaction classifiers and classifier scores of all (or some) of participants may be aggregated and averaged. The meeting notes sections are then may be arranged, formatted (e.g., bolded, highlighted, and the like) according to an averaged classifier score. As previously described, a system for managing meeting notes may determine an aggregate engagement level for all of the participants. For example, an aggregated engagement level may be determined by averaging engagement level for all (or some) of the participants for each point in time of the meeting (such averaged engagement level is referred to as a time-dependent averaged engagement level). In various embodiments, other aggregated intensity levels for various reaction classifiers may be determined. For example, an aggregated intensity level for a reaction classifier "disappointment" may be determined.

In some cases, an aggregated intensity level for a given reaction classifier for a single participant (e.g., participant 201) may be determined by time-averaging intensity levels for a given reaction classifier. In some cases, any other suitable statistics may be obtained for an example intensity level (e.g., intensity level 961, as shown in FIG. 9C) of a reaction classifier, and/or any operations may be applied to intensity level 961 to further analyze a reaction of participant 201. For example, intensity level 961 may be squared and averaged over time, a standard deviation for intensity level 961 may be calculated, peaks of intensity levels may be identified, a running time average for intensity level 961 may be calculated over a predetermined time window, or any other operations (e.g., mathematical operations) may be done to analyze intensity level 961. For example, a Fourier transform for intensity level 961 may be used to identify periodic patterns for intensity level 961.

In various embodiments, engagement level for a participant may be determined base on how often the participant is speaking, how much the participant is speaking, the relevancy of speech of the participant to the conversation during the meeting, whether a reaction of a participant may be correlated with speech of other participants, whether a reaction of a participant is correlated with content of the meeting (e.g., slides presented during the meeting), or any other suitable indicators that may be used to determine the engagement level of a participant. In some cases, a combination of indicators may be used to determine the engagement level of the participant, and in some cases, the combination of the indicators may be used as an input to a machine learning model to determine the engagement level of a participant. In some cases, reaction classifiers associated with emotional nonverbal information having a corresponding emotional intensity may be one of the factors used for evaluating an engagement level for a participant. However, other nonverbal methods (e.g., how frequently a participant is speaking) for evaluating the engagement level may be used separately or in combination with emotional nonverbal information.

Consistent with disclosed embodiments, the time-dependent averaged engagement level may be used to provide an indication of times (or time intervals) during a meeting at which the engagement level is higher than a predetermined threshold value, thus, indicating that such times (or time intervals) may correspond to important portions of the meeting. In some cases, the importance of the entire meeting may be evaluated by time-averaging time-dependent averaged engagement level to obtain a time-independent averaged engagement level. For example, if time-independent averaged engagement level is above a threshold value, the meeting may be determined to be important.

Consistent with disclosed embodiments, managing meeting notes may include determining an aggregate engagement level for the meeting based on the engagement levels for the at least one of the one or more meeting participants, and determining one or more important parts of the meeting based on the determined aggregate engagement level. In some embodiments, as described above, important parts of the meeting may be emphasized in a transcript corresponding to a meeting.

Figure 14A:
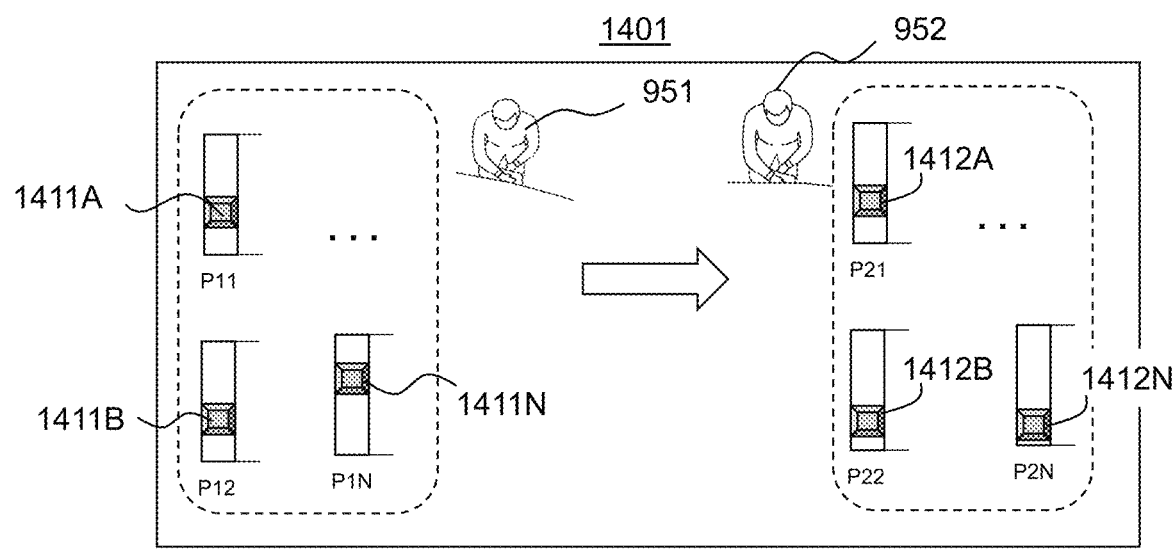
FIG. 14A illustrates an interface for determining the dependence of reaction classifiers for one participant based on reaction classifiers for another participant, consistent with disclosed embodiments.
Figure 14B:
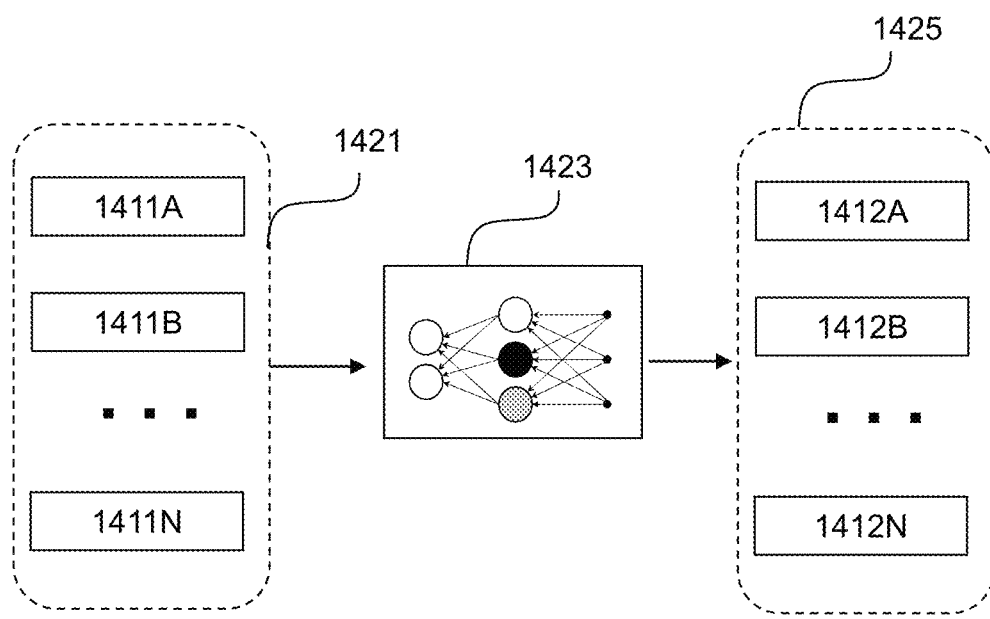
FIG. 14B shows an example computer-based model trained to predict the dependence of reaction classifiers for one participant based on reaction classifiers for another participant, consistent with disclosed embodiments.

In various embodiments, based on a historical data during various meetings, system 100 may be able to predict classifier scores for reaction classifiers for a participant (e.g., participant 952, as shown in FIG. 14A) based on classifier scores for reaction classifier for another participant (e.g., participant 921, as shown in FIG. 14A). For example, system 100 may provide an interface 1401 that may allow a user (e.g., a moderator of a meeting) to select classifier scores (e.g., by moving sliders 1411A-1411N) for reaction classifiers (e.g., for reaction classifiers P11, P12, . . . P1N) for participant 951. In an example embodiment, based on selections 1411A-1411N, interface 1401 may estimate classifier scores 1412A-1412N for reaction classifiers P21, P22, . . . P2N for participant 952. The estimation may be made based on historical data obtained by analyzing data of various historical meetings. In some cases, historical meetings may include participants 951 and 952. In some cases, an estimation for classifier scores 1412A-1412N may be made using a machine learning model (e.g., model 1423, as shown in FIG. 14B). In an example embodiment, model 1423 may take as an input values 1411A-1411N for classifier scores and output classifier score values 1412A-1412N.

Figure 15:
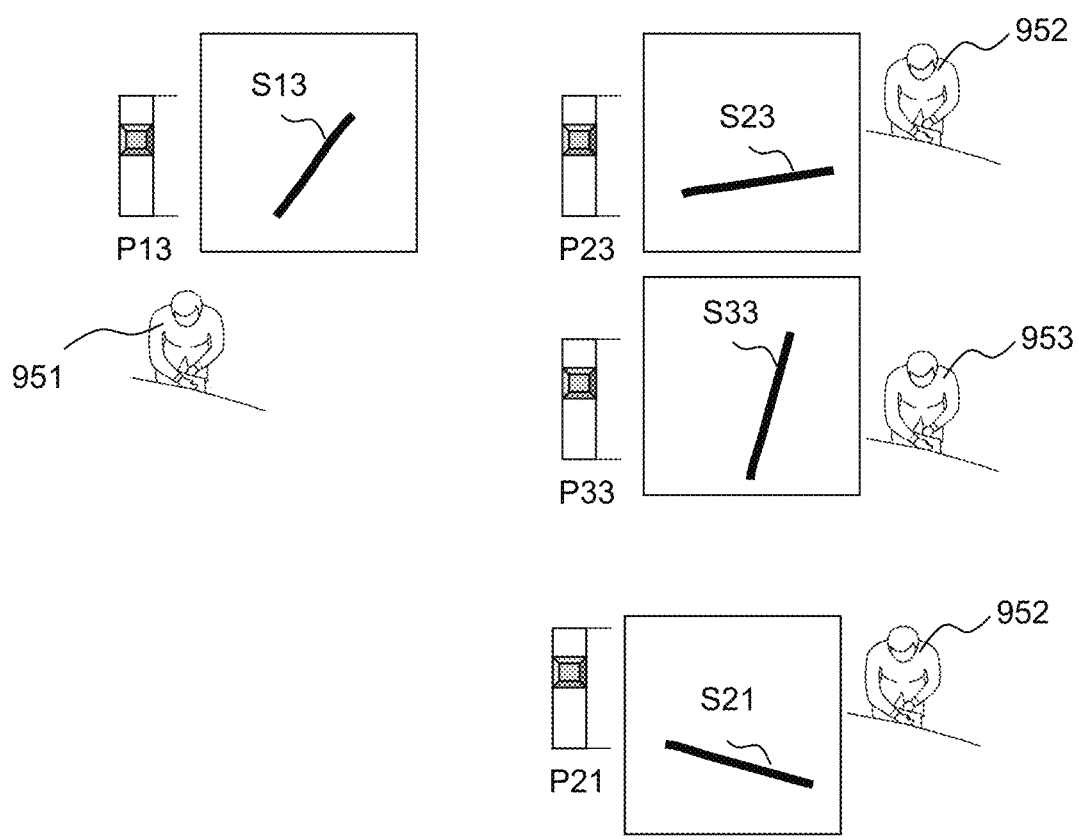
FIG. 15 shows how an example change in reaction classifier for one participant affects change in reaction classifier for other participants, consistent with disclosed embodiments.

FIG. 15 shows a correlation between a change S13 (indicated by a slope) in a classifier score for a reaction classifier (e.g., classifier P13) for a participant 951 and corresponding changes S23 and S33 for classifier scores for reaction classifiers P23 for participant 952 and reaction classifiers P33 for participant 953. For example, change S23 in classifier P23 may not be sensitive to change S13, as indicated by a relatively small slope, while change S33 in classifier P33 may be very sensitive to change S13, as indicated by a large slope. FIG. 15 also shows that change S13 in classifier P13 may lead to a change S21, as shown in FIG. 15. In an example embodiment, understanding how changes in a first classifier score for a first reaction classifier of a first participant affect changes in a second classifier score for a second reaction classifier of a second participant may be important in determining how to adjust various parameters of a meeting. For example, if increasing a volume of a speech (i.e., change in the first classifier score relating to the volume of the speech) for the first participant results in the second participant increasingly getting angrier (i.e., change in the second classifier score relating to the second reaction classifier "anger"), such volume increase may be reduced. In some embodiments, a computer-based system for managing a meeting may suggest changes to participants during a progress of the meeting or after a completion of the meeting.

FIG. 16 illustrates a flowchart for an example process 1600 of managing meeting notes based on nonverbal information. Process 1600 may be implemented with any of the herein disclosed systems for managing meeting notes. Generally, as shown in FIG. 16, the steps of process 1600 may include receiving nonverbal information (step 1602), determining engagement level (step 1604), composing meeting notes (step 1606), and storing the notes for subsequent review (step 1608).

In step 1602, the system for managing meeting notes may receive nonverbal information. For example, the system for managing meeting notes (e.g., system 100) may receive nonverbal information from people participating in a meeting. The nonverbal information may include information associated with nonverbal cues of each of the people participating in the meeting.

In step 1604, the system 100 may determine an engagement level. For example, system 100 may determine an engagement level for each of the one or more people based on the nonverbal information received in step 1602. In some cases, emotional classification/emotional intensity may be representative examples for measuring engagement level and any other nonverbal methods for determining engagement level may be used separately or in combination with emotions, as described herein. For example, loudness of a participant or a rate of speech for the participant may be used for determining the engagement level for the participant.

In some embodiments, machine learning algorithms may be used to determine an engagement level. For example, a machine learning algorithm may be trained on nonverbal information from many people and be able to determine that nonverbal information corresponding with a certain person is likely to correspond with an engagement level for that certain person.

As previously described, system 100 may store reaction classifiers and classifier scores for a user in a user profile. In some cases, system 100 can store user patterns for various parameters describing a reaction of a participant (such as classifier scores for reaction classifiers). For example, user patterns may include base-level classifier scores for reaction classifiers, as described above. For example, a user pattern for an example participant may describe a participant as a highly emotional for a range of emotions (characterized by reaction classifiers). This pattern may be taken into account, as described above in relation to base-level reaction classifiers, to correctly determine a nonverbal intensity (i.e., classifier score) for a participant for a given reaction classifier. In some cases, a machine learning model can be used to determine classifier scores. The machine learning model may be trained to determine reaction classifiers based on historical patterns for classifier scores for reaction classifiers for a participant, to determine a correct classifier score for a reaction classifier for a participant.

The machine learning algorithm may be able to determine, for example, that a person with a specific heart rate, blood pressure level, or other biometric information may be very engaged. In other embodiments, a machine learning algorithm may be able to determine, for example, that a person with a certain posture may be very engaged. In still other embodiments, a machine learning algorithm may be able to determine, for example, that a person with a certain facial expression may be very engaged. In still other embodiments, a machine learning algorithm may be able to determine, for example, that a person whose eyes are focusing on a certain area may be very engaged. In still other embodiments, a machine learning algorithm may be able to determine, for example, that a person with a certain tone of voice may be very engaged. In still other embodiments, a machine learning algorithm may be able to determine, for example, that a person with a certain vocal intensity may be very engaged. One of ordinary skill in the art will understand that a machine learning algorithm may be trained on any combination of the kinds of nonverbal information listed above.

One of ordinary skill in the art will also understand that many different machine learning algorithms may be used, both supervised and unsupervised. For example, linear regression, logistic regression, classification and regression trees, principal component analysis, Bayesian machine learning, K-nearest neighbors, and other machine learning algorithms and combinations thereof may be used.

In step 1606, the system for managing meeting notes 100 composes meeting notes. For example, the system for managing meeting notes 100 may compose meeting notes based on the engagement level determined in step 1604.

In step 1608, the system for managing meeting notes 100 stores the notes for subsequent review. For example, the system for managing meeting notes 100 may store the notes composed in step 1606 in a database, such as database 102, as shown in FIG. 1, for later review. In some embodiments, the review may be conducted by a person. In other embodiments, the review may be automated.

Embodiments of the present disclosure may be implemented through any suitable combination of hardware, software, and/or firmware. Systems and components of the present disclosure may be implemented with programmable instructions implemented by a hardware processor. In some embodiments, a non-transitory computer-readable storage medium, including instructions is also provided, and the instructions may be executed by a processor device for performing the above-described steps and methods. Common forms of non-transitory media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, an EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

As described above, system 100 may include various devices, such as processors, memory devices, and various client devices. For example, client devices may include one or more computing devices configured to perform one or more operations consistent with disclosed embodiments. For example, client devices may include a desktop computer, a laptop, a server, a mobile device (e.g., tablet, smartphone, etc.), a set-top box, a gaming device, a wearable computing device, or another type of computing device. The client devices may include one or more processors configured to execute software instructions stored in memory, such as memory included in client devices, to perform various operations. The client devices may be configured for wired and/or wireless communications and may include software that, when executed by a processor, performs internet-related communication (e.g., TCP/IP) and content display processes. For instance, client devices may execute browser software that generates and displays interfaces, including content on a display device included in, or connected to, client devices. The client devices may execute software applications that allow client devices to communicate with components over system 100, and generate and display content in interfaces via display devices included in client devices.

The disclosed embodiments are not limited to any particular configuration of client devices. In certain embodiments, client devices may be configured to execute software instructions relating to location services, such as GPS locations. For example, client devices may be configured to determine a geographic location and provide location data and time stamp data corresponding to the location data to system 100, as shown in FIG. 1.

System 100 may include one or more computing systems that perform operations to store and provide content. System 100 may include databases (e.g., database 102, as shown in FIG. 1) that include user profile and any data (e.g., historical data) associated with previously conducted meetings. System 100 may also include processors (e.g., processor 100A) that may include multiple core processors to handle concurrently multiple operations and/or streams. For example, system 100 may include parallel processing units to concurrently handle information obtained from multiple client devices.

Database 120 may include one or more computing devices configured with appropriate software to perform operations for providing information to and from system 100. Database 102 may include, for example, Oracle™ database, Sybase™ database, or other relational databases or non-relational databases, such as Hadoop™ sequence files, HBase™, or Cassandra™. In an illustrative embodiment, database 102 may include computing components (e.g., database management system, database server, etc.) configured to receive and process requests for data stored in memory devices of the database and to provide data from the database.

System 100 may include a network system (e.g., system 950, as shown in FIG. 9C). Network system 950 may include any type of connection between various computing components. For example, network system 950 may facilitate the exchange of information via network connections that may include Internet connections, Local Area Network connections, near field communication (NFC), or other suitable connection(s) that enables the sending and receiving of information between the components of system 950. In some embodiments, one or more components of system 950 may communicate directly through a dedicated communication link(s).

It should be noted that the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C. or A and B. or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor, can perform the disclosed methods. The computing units and other functional units described in this disclosure can be implemented by hardware, or software, or a combination of hardware and software.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

The foregoing description has been presented for purposes of illustration. It is not exhaustive and is not limited to precise forms or embodiments disclosed. Modifications and adaptations of the embodiments will be apparent from a consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from a consideration of the specification and practice of the embodiments disclosed herein. It is intended that the specification and examples be considered as an example only, with a true scope and spirit of the disclosed embodiments being indicated by the following claims.

What is claimed is:

1. A method for managing meeting notes comprising:
   receiving, by a processor, nonverbal cue information associated with one or more meeting participants via a data capturing device;
   determining, by the processor, a reaction classifier for each of the one or more meeting participants associated with the nonverbal cue information;
   determining, by the processor, a reaction classifier intensity associated with the reaction classifier determined for the one or more meeting participants, the reaction classifier intensity characterized by a numerical amplitude;
   selecting, by the processor, a first reaction classifier intensity corresponding to a first reaction classifier for a first meeting participant, the first reaction classifier intensity characterized by a numerical amplitude;
   determining, by the processor, a first time-dependent change of the first reaction classifier intensity, wherein the first time-dependent change is represented by a first slope indicating a ratio of a change of the first reaction classifier intensity to a change of time;

selecting, by the processor, a second reaction classifier intensity corresponding to a second reaction classifier for a second meeting participant, the second reaction classifier intensity characterized by a numerical amplitude;

determining, by the processor, a second time-dependent change of the second reaction classifier intensity, wherein the second time-dependent change is represented by a second slope indicating a ratio of a change of the second reaction classifier intensity to a change of time;

determining, by the processor, a correlation between the first slope and the second slope;

adjusting, by the processor, a meeting parameter based on the correlation;

composing, by the processor, meeting notes based on the determined reaction classifier intensity for the one or more meeting participants and based on the determined correlation; and storing the meeting notes in a database.

2. The method of claim 1, wherein determining the reaction classifier intensity for the one or more meeting participants is further based on a machine learning algorithm.

3. The method of claim 1, wherein the nonverbal cue information is based on at least one of vocal tonality information or vocal intensity information.

4. The method of claim 1, wherein the managing meeting notes is further based on a transcript of a meeting.

5. The method of claim 4, further comprising determining one or more important parts of a meeting for each of the one or more meeting participants based on the determined reaction classifier and the reaction classifier intensity for at least one of the one or more meeting participants and wherein managing meeting notes comprises emphasizing parts of the transcript corresponding to the one or more important parts of the meeting.

6. The method of claim 5, wherein emphasizing parts of the transcript corresponding to the one or more important parts of the meeting comprises one of arranging the parts of the transcript corresponding to the one or more important parts of the meeting at the top of the meeting notes, bolding the parts of the transcript corresponding to the one or more important parts of the meeting in the meeting notes, or underlining the parts of the transcript corresponding to the one or more important parts of the meeting in the meeting notes.

7. The method of claim 4, further comprising:
determining an aggregate reaction classifier intensity for the meeting based on the reaction classifier for the at least one of the one or more meeting participants;
determining one or more important parts of the meeting based on the determined aggregate reaction classifier intensity, and
wherein managing the meeting notes comprises emphasizing parts of the transcript corresponding with the one or more important parts of the meeting.

8. The method of claim 7, wherein determining the aggregate reaction classifier intensity for the meeting is further based on a machine learning algorithm.

9. The method of claim 1, further comprising:
determining a base-level reaction classifier intensity for the reaction classifier; and
determining a deviation of the reaction classifier intensity from the base-level reaction classifier intensity.

10. The method of claim 1, further comprising:
determining that the first time-dependent change of the first reaction classifier intensity negatively affects the second time-dependent change of the second reaction classifier intensity; and
adjusting a meeting parameter related to the first reaction classifier intensity negatively.

11. A system for managing meeting notes based on emotions comprising a nonverbal information processing system configured to:
receive nonverbal cues for one or more meeting participants via a data capturing device;
generate nonverbal information based on the received nonverbal cues for one or more meeting participants;
determine a reaction classifier for each of the one or more meeting participants based on the received nonverbal information;
determine a reaction classifier intensity association with the reaction classifier determined for the one or more meeting participants, wherein the reaction classifier intensity is characterized by a numerical amplitude;
select a first reaction classifier intensity corresponding to a first reaction classifier for a first meeting participant, the first reaction classifier intensity characterized by a numerical amplitude;
determine a first time-dependent change of the first reaction classifier intensity, wherein the first time-dependent change is represented by a first slope indicating a ratio of a change of the first reaction classifier intensity to a change of time;
select a second reaction classifier intensity corresponding to a second reaction classifier for a second meeting participant, the second reaction classifier intensity characterized by a numerical amplitude;
determine a second time-dependent change of the second reaction classifier intensity, wherein the second time-dependent change is represented by a second slope indicating a ratio of a change of the second reaction classifier intensity to a change of time;
determine a correlation between the first slope and the second slope;
adjust a meeting parameter based on the correlation;
compose meeting notes based on the determined reaction classifier intensity for the one or more meeting participants and based on the determined correlation; and
store the meeting notes for subsequent review in a database.

12. The system of claim 11, wherein the nonverbal information comprises a reaction classifier having an associated intensity level characterized by a numerical amplitude, the reaction classifier and the associated intensity level determined for each of the one or more meeting participants, wherein the associated intensity level is determined for different points in time for a meeting.

13. The system of claim 12, wherein the reaction classifier is a classifier for a mental state of each of the one or more meeting participants.

14. The system of claim 11, wherein determining the reaction classifier intensity for the one or more meeting participants is further based on a machine learning algorithm.

15. The system of claim 11, wherein the nonverbal information is based on at least one of biometric information, posture information, facial expression information, ocular focus information, vocal tonality information, and vocal intensity information.

16. The system of claim 11, wherein managing meeting notes is further based on a transcript of a meeting.

17. The system of claim 16, wherein the nonverbal information processing system is further configured to determine one or more important parts of the meeting based on the determined reaction classifier intensity for at least one of the one or more meeting participants and wherein managing meeting notes comprises emphasizing parts of the transcript corresponding with the important part of the meeting.

18. The system of claim 16, wherein the nonverbal information processing system is further configured to:
  determine an aggregate reaction classifier intensity for the meeting based on the reaction classifier intensity for the at least one of the one or more meeting participants;
  determine one or more important parts of a meeting based on the determined aggregate reaction classifier intensity; and
  wherein managing meeting notes comprises emphasizing parts of the transcript corresponding with the important part of the meeting.

19. The system of claim 11, wherein the nonverbal information processing system is further configured to:
  determine that the first time-dependent change of the first reaction classifier intensity negatively affects the second time-dependent change of the second reaction classifier intensity; and
  adjust a meeting parameter related to the first reaction classifier intensity negatively.

\* \* \* \* \*